(12) United States Patent
Maeda

(10) Patent No.: US 11,743,575 B2
(45) Date of Patent: Aug. 29, 2023

(54) ELECTRONIC APPARATUS CAPABLE OF MOVING EXECUTION POSITION OF SPECIFIC FUNCTION RELATED TO SHOOTING, CONTROL METHOD THEREFOR, AND STORAGE MEDIUM

(71) Applicant: CANON KABUSHIKI KAISHA, Tokyo (JP)

(72) Inventor: Ryo Maeda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 7 days.

(21) Appl. No.: 17/189,601

(22) Filed: Mar. 2, 2021

(65) Prior Publication Data
US 2021/0281769 A1 Sep. 9, 2021

(30) Foreign Application Priority Data
Mar. 5, 2020 (JP) .................. 2020-038127

(51) Int. Cl.
    *H04N 23/63* (2023.01)
    *H04N 23/62* (2023.01)

(52) U.S. Cl.
    CPC .......... *H04N 23/632* (2023.01); *H04N 23/62* (2023.01)

(58) Field of Classification Search
    CPC ......... H04N 5/232935; H04N 5/23216; H04N 5/232127; H04N 5/23219; H04N 5/23245; H04N 5/232939
    See application file for complete search history.

(56) References Cited

U.S. PATENT DOCUMENTS

| | | | | |
|---|---|---|---|---|
| 2004/0125220 A1* | 7/2004 | Fukuda | ............ | H04N 5/232945 348/234 |
| 2006/0007238 A1* | 1/2006 | Yamamoto | ............. | G03B 13/00 345/589 |
| 2006/0038907 A1* | 2/2006 | Katsuura | .............. | H04N 1/0044 348/333.01 |
| 2008/0084398 A1* | 4/2008 | Ito | ...................... | H04N 5/23216 345/173 |
| 2012/0050578 A1* | 3/2012 | Aoki | .................. | H04N 5/23245 348/240.2 |
| 2014/0028885 A1* | 1/2014 | Ma | ...................... | H04N 5/23216 348/333.01 |
| 2016/0286118 A1* | 9/2016 | Cho | ........................ | H04N 23/62 |
| 2017/0163918 A1* | 6/2017 | Chen | ................. | H04N 5/232935 |
| 2020/0106955 A1* | 4/2020 | Fleizach | ............ | H04N 5/23219 |

FOREIGN PATENT DOCUMENTS

JP     2012-244532 A     12/2012

* cited by examiner

*Primary Examiner* — Michael Roswell
(74) *Attorney, Agent, or Firm* — Cowan, Liebowitz & Latman, P.C.

(57) ABSTRACT

An electronic apparatus is capable to set a specific parameter related to exposure, and performs control so that display is performed in a first display mode that displays a live-view image with brightness based on the specific parameter. The electronic apparatus accepts an instruction for moving an execution position of a specific function related to shooting and, in a case where the instruction is received while display is performed in the first display mode, performs control to display a live-view image in a second display mode that displays the live-view image with brightness that is not relevant to the specific parameter.

11 Claims, 11 Drawing Sheets

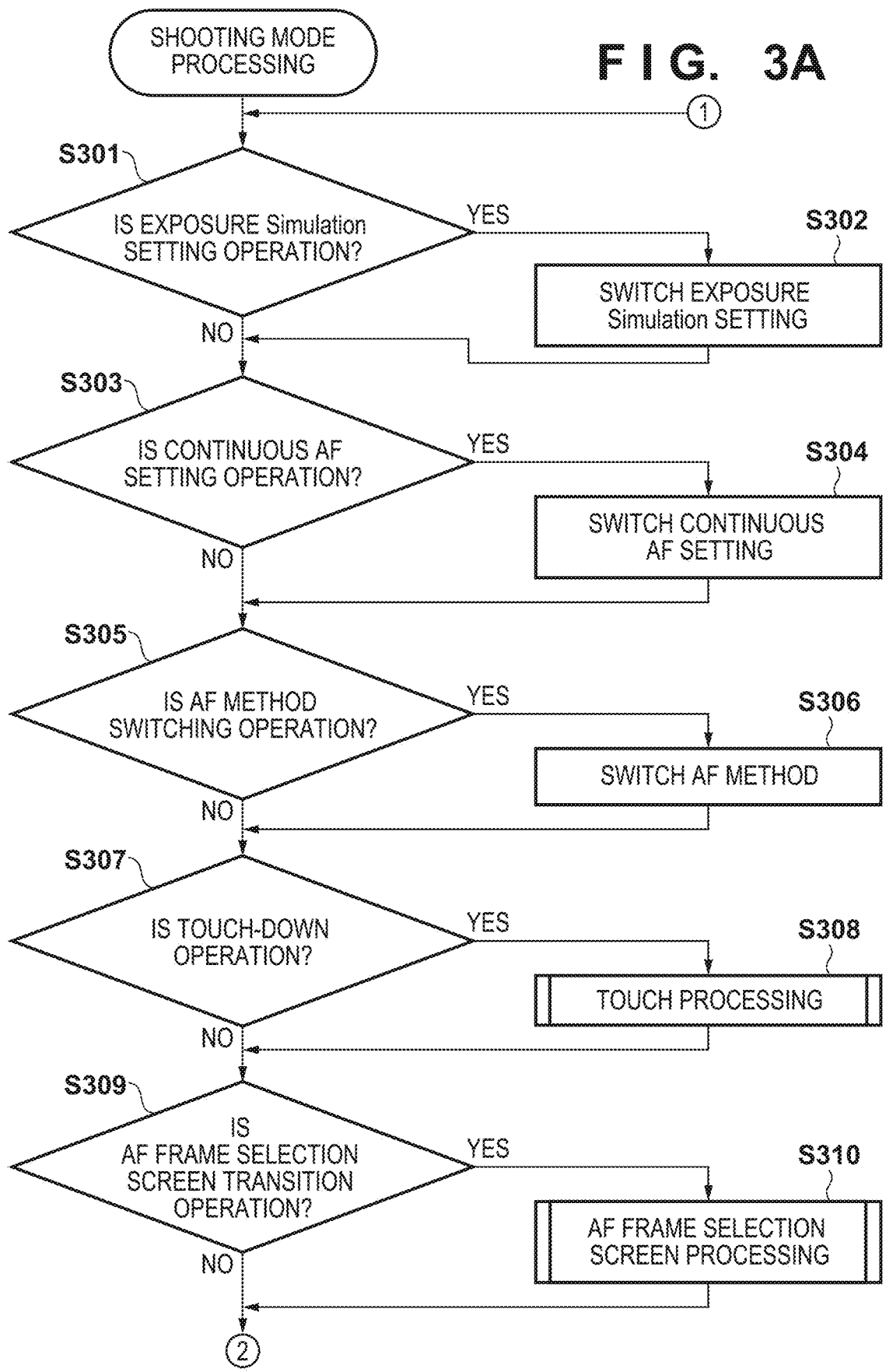

FIG. 4A

| | | | | | | |
|---|---|---|---|---|---|---|
| 📷 | AF | ▶ | 🔧 | 📷 | ☆ | |
| 1 2 3 4 5 6 | | | | | | SHOOT3 |

| | |
|---|---|
| EXPOSURE COMPENSATION / AEB SETTING | -3..2..1..0..1..2..+3 |
| 📷 SETTING RELATED TO ISO FILM SPEED | |
| AUTO LIGHTING OPTIMAIZER | |
| HIGH LUMINANCE SIDE · TONE PRIORITY | OFF |
| PHOTOMETRIC TIMER | 8 second |
| EXPOSURE Simulation | YES |

FIG. 4B

| | |
|---|---|
| EXPOSURE Simulation | ) YES — 401 |
| | ⊙ DURING STOP-DOWN — 402 |
| | NO — 403 |

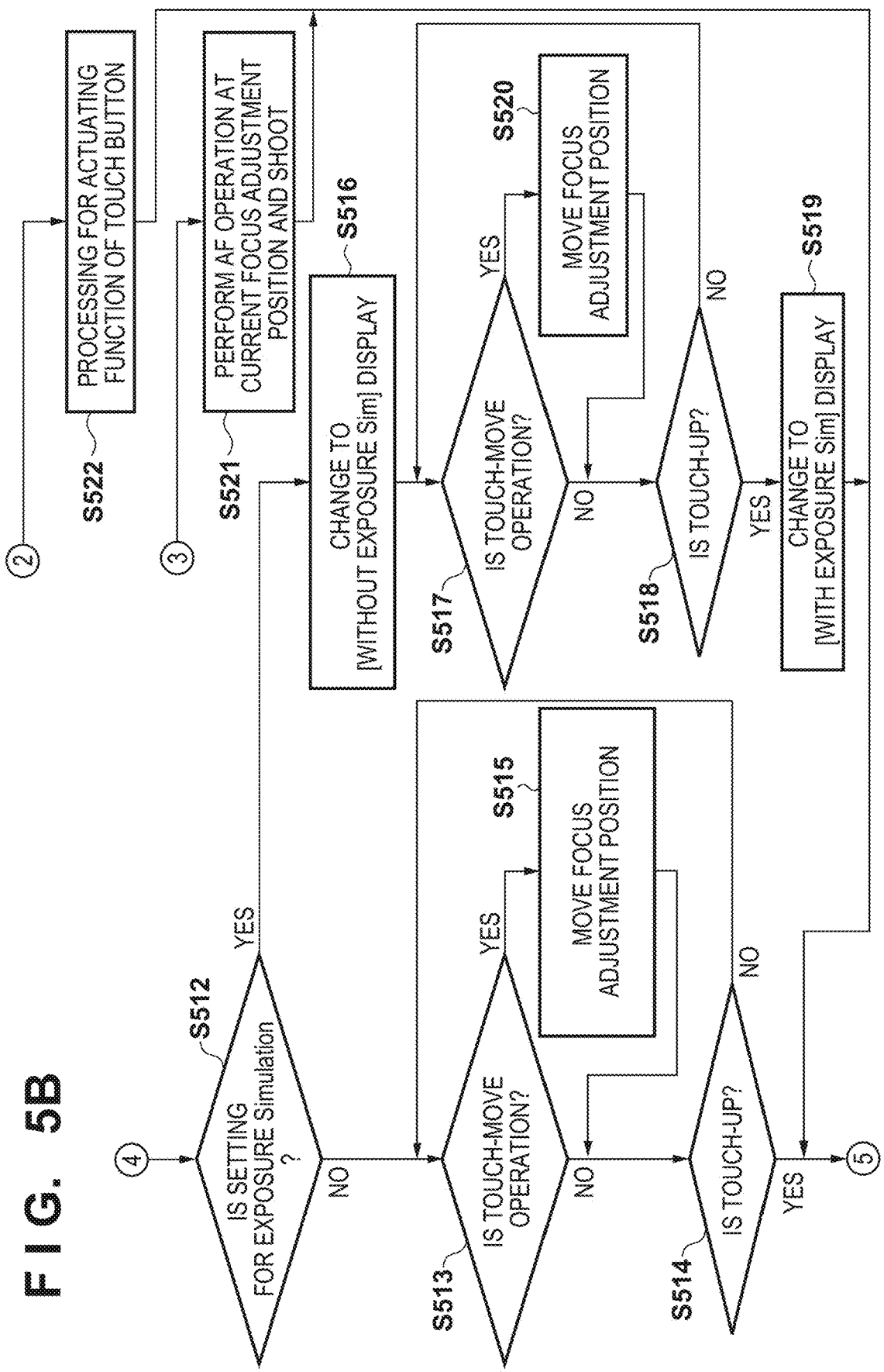

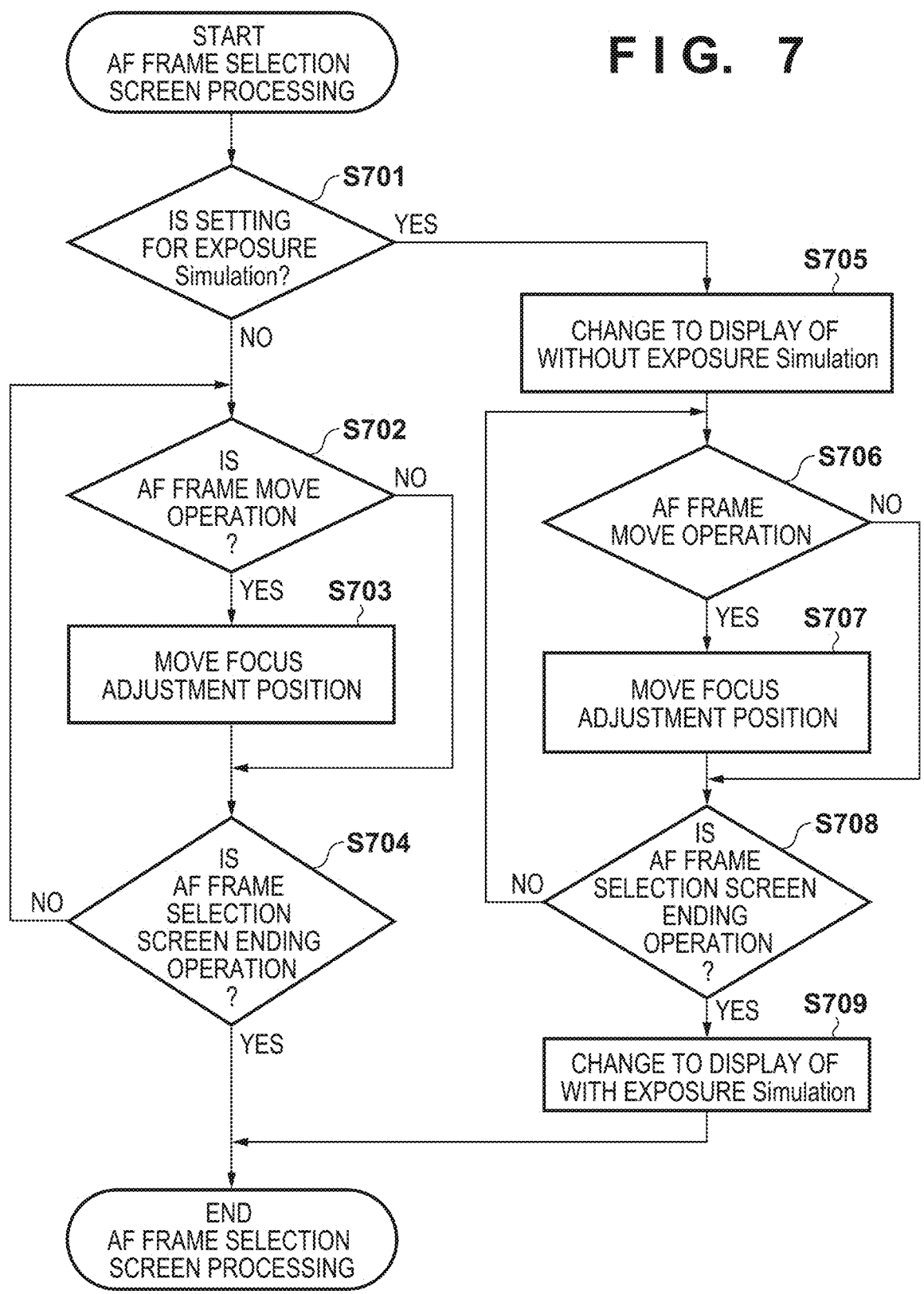

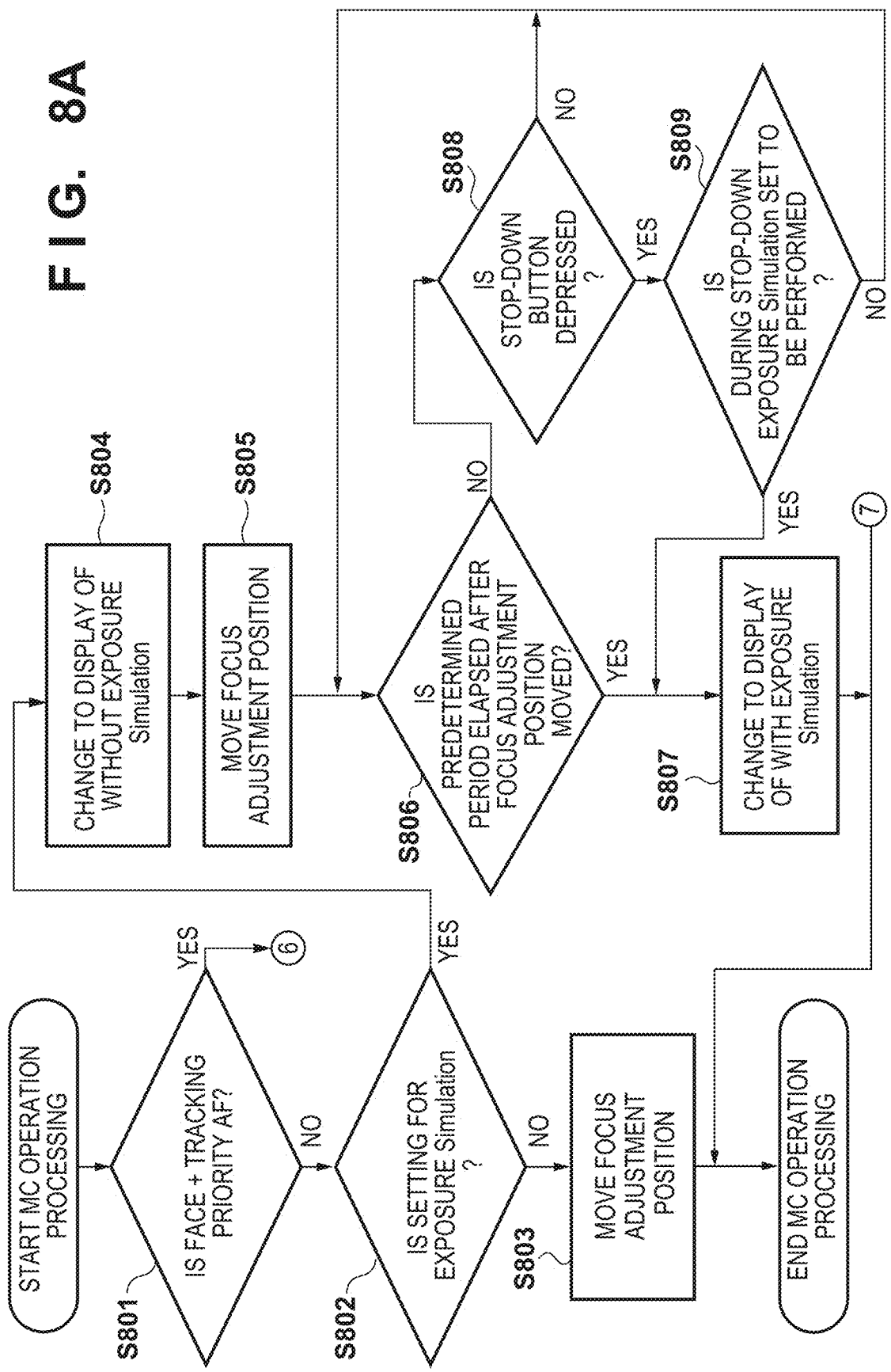

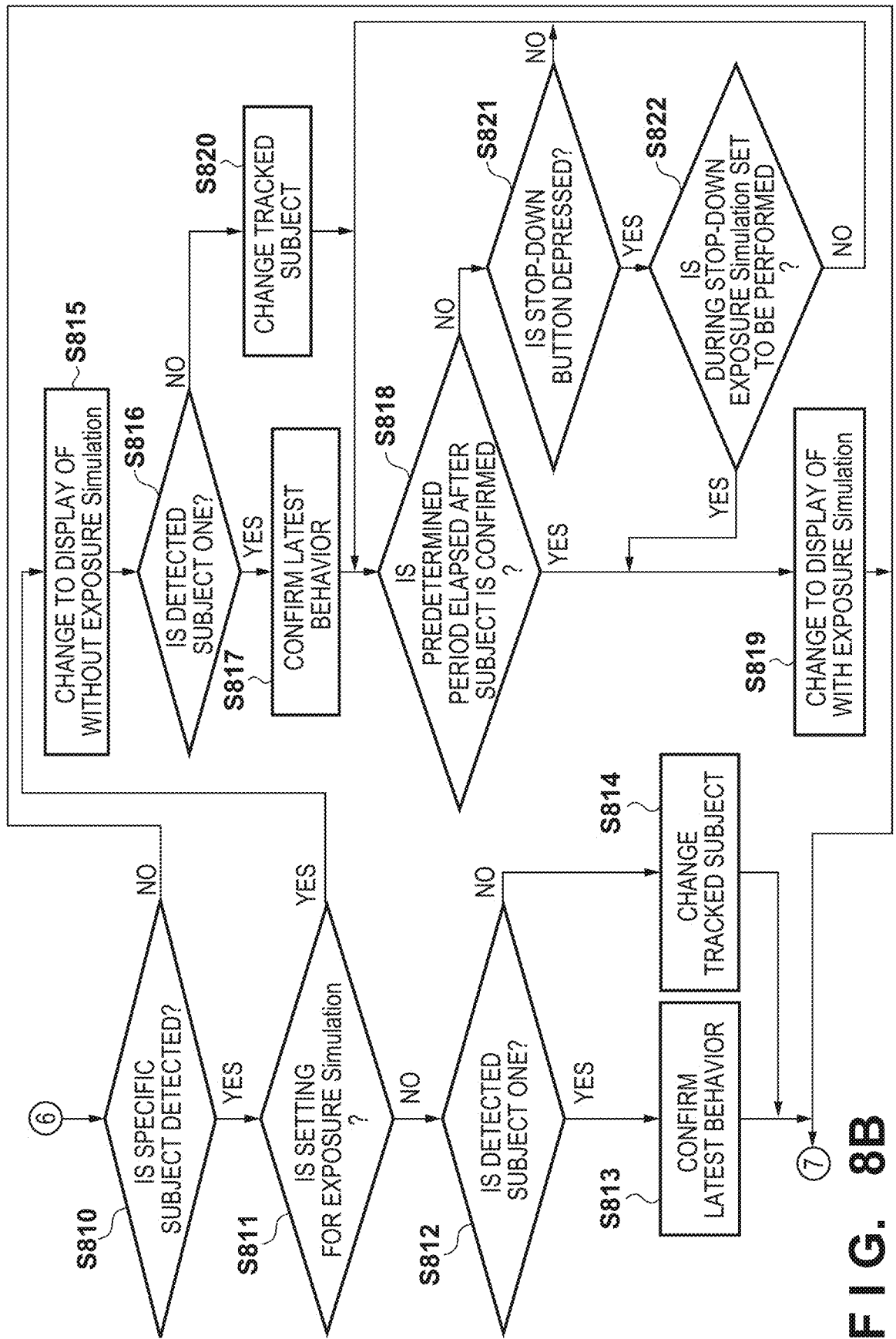

ELECTRONIC APPARATUS CAPABLE OF MOVING EXECUTION POSITION OF SPECIFIC FUNCTION RELATED TO SHOOTING, CONTROL METHOD THEREFOR, AND STORAGE MEDIUM

BACKGROUND OF THE INVENTION

Field of the Invention

The present invention relates to an electronic apparatus capable of moving the execution position of a specific function related to shooting, a control method therefor, and a storage medium.

Description of the Related Art

Conventionally, it is known that some image capturing devices, such as digital cameras, have a live-view display function that displays images obtained by an image sensor on a display apparatus in real time.

Also, it is known that digital cameras have a function of displaying live-view images reflecting the exposure value and the depth of field set by a user in the form of simulation display, thereby enabling the user to confirm, before shooting, the depth of field and the exposure state at the time of actual shooting (Japanese Patent Laid-Open No. 2012-244532).

However, according to the technique proposed by Japanese Patent Laid-Open No. 2012-244532, in a case where simulation display is performed in a shooting standby state, the set exposure value is reflected, and it may thus be difficult to visually recognize a subject. Specifically, in a case where a user has set an underexposure value in an attempt to shoot a low-key (dark) photograph, live-view display becomes dark as well, which makes it difficult to visually recognize a subject in live view. That is to say, there is a problem that, in the case of configuration of a setting that enables a user to arbitrarily select a position, such as a focus adjustment position, it is difficult to visually recognize a subject and to select an accurate focus adjustment position.

SUMMARY OF THE INVENTION

The present disclosure has been made in consideration of the aforementioned issues, and realizes a technique that can make it easy to make an accurate change to the setting of a focus adjustment position, even during simulation display under an exposure value set by a user.

In order to solve the aforementioned problems, one aspect of the present disclosure provides an electronic apparatus comprising: one or more processors; and a memory storing programs which, when the programs are executed by the one or more processors, cause the electronic apparatus to function as: a setting unit configured to set a specific parameter related to exposure; a control unit configured to perform control so that display is performed in a first display mode that displays a live-view image with brightness based on the specific parameter set by the setting unit; and an acceptance unit configured to accept an instruction for moving an execution position of a specific function related to shooting, wherein in a case that the instruction is received while display is performed in the first display mode, the control unit performs control to display a live-view image in a second display mode that displays the live-view image with brightness that is not relevant to the specific parameter set by the setting unit.

Another aspect of the present disclosure provides, a control method of an electronic apparatus, the control method comprising: setting a specific parameter related to exposure; performing control so that display is performed in a first display mode that displays a live-view image with brightness based on the specific parameter set in the setting; and accepting an instruction for moving an execution position of a specific function related to shooting, wherein in a case that the instruction is received while display is performed in the first display mode, performing control to display a live-view image in a second display mode that displays the live-view image with brightness that is not relevant to the specific parameter set in the setting.

Still another aspect of the present disclosure provides, a non-transitory computer-readable storage medium comprising instructions for performing a control method of an electronic apparatus, the control method comprising: setting a specific parameter related to exposure; performing control so that display is performed in a first display mode that displays a live-view image with brightness based on the specific parameter set in the setting; and accepting an instruction for moving an execution position of a specific function related to shooting, wherein in a case that the instruction is received while display is performed in the first display mode, performing control to display a live-view image in a second display mode that displays the live-view image with brightness that is not relevant to the specific parameter set in the setting.

The present invention can make it easy to make an accurate change to the setting of a focus adjustment position, even during simulation display under an exposure value set by a user.

BRIEF DESCRIPTION OF THE DRAWINGS

FIGS. 3A and 3B are flowcharts showing a sequence of operations of main processing according to the present embodiment.

FIGS. 4A and 4B are diagrams showing examples of screens that show setting items for performing simulation display using an exposure value according to the present embodiment.

FIGS. 5A and 5B are flowcharts showing a sequence of operations of touch processing according to the present embodiment.

FIG. 7 is a flowchart showing a sequence of operations of AF frame selection screen processing according to the present embodiment.

FIGS. 8A and 8B are flowcharts showing a sequence of operations of MC (multi-controller) operation processing according to the present embodiment.

DESCRIPTION OF THE EMBODIMENTS

Figure 1A:
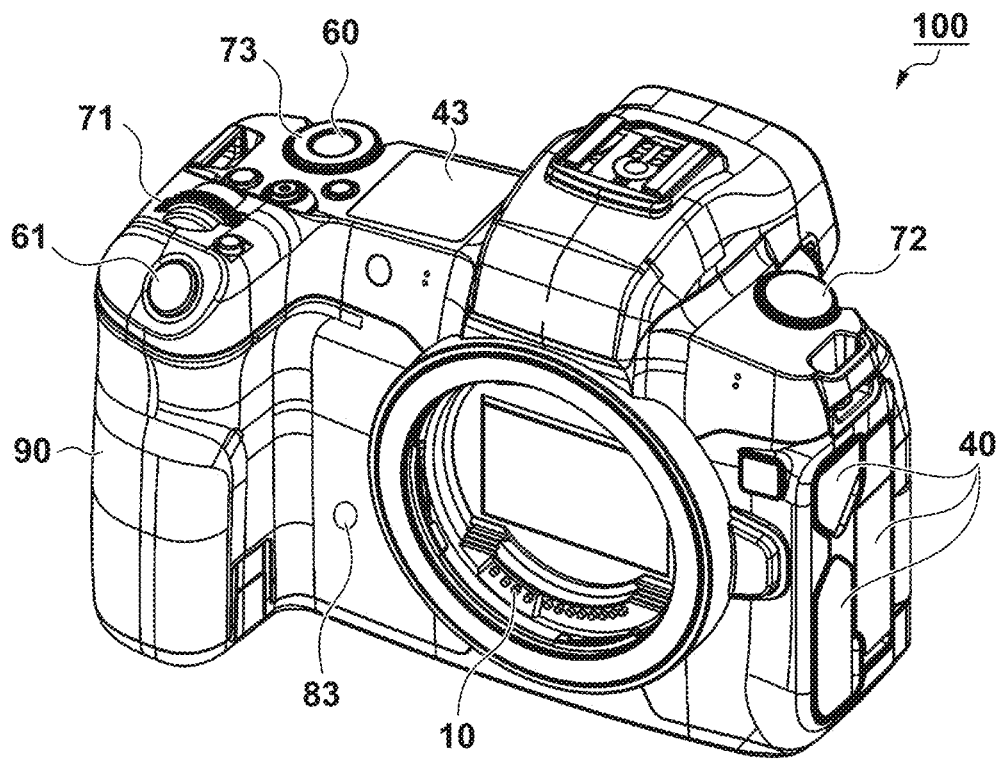
FIGS. 1A and 1B are external views of a digital camera as one example of an electronic apparatus according to an embodiment of the present invention.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

<Configuration (External Appearance) of Digital Camera 100>

Figure 1B:
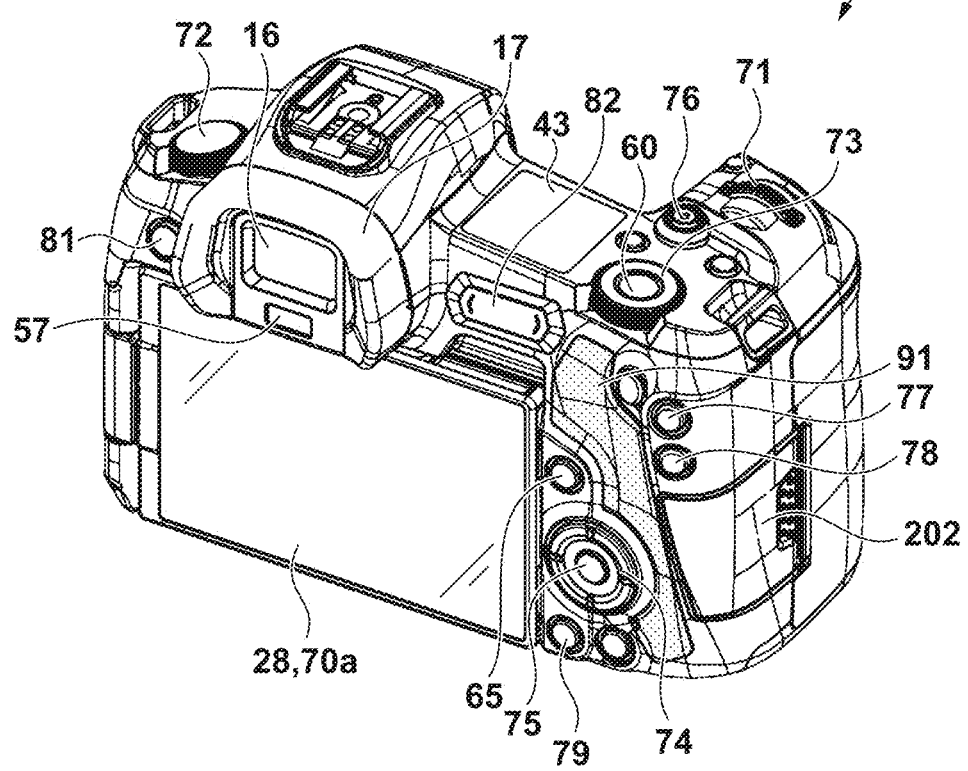

With reference to FIG. 1A and FIG. 1B, the following describes an external appearance and a configuration of a digital camera 100 according to the present embodiment as one example of an electronic apparatus. FIG. 1A is a frontal perspective view of the digital camera 100, and FIG. 1B is a rear perspective view of the digital camera 100.

A display unit 28 is a display unit provided on a rear surface of the digital camera 100, and displays images and various types of information. A touchscreen 70a can detect a touch operation on a display surface (touch operation surface) of the display unit 28. A viewfinder external display unit 43 is a display unit provided on a top surface of the digital camera 100, and displays a variety of setting values of the digital camera 100 related to a shutter speed, a diaphragm, and the like. A shutter button 61 is an operation member for issuing a shooting instruction. A mode changeover switch 60 is an operation member for switching among various types of modes. Terminal covers 40 are covers for protecting connectors (not shown) for connection cables and the like that allow the digital camera 100 to be connected to an external device.

A main electronic dial 71 is a rotary operation member; for example, setting values related to the shutter speed, diaphragm, and the like can be changed by rotating the main electronic dial 71. A power switch 72 is an operation member that switches between power-ON and power-OFF of the digital camera 100. A sub electronic dial 73 is a rotary operation member; rotating the sub electronic dial 73 enables, for example, moving of a selection frame (cursor) and jumping to the next image. A four-direction key 74 is configured in such a manner that its upper, lower, left, and right portions can each be depressed, and processing corresponding to a pushed portion of the four-direction key 74 can be performed. A SET button 75 is a push button, and is mainly used in, for example, determining a selection item. A multi-controller (MC) 65 can accept directional instructions that are issued by pushing/tilting the multi-controller 65 in eight directions, namely up, upper-right, right, lower-right, down, lower-left, left, and upper-left, and a depression operation on a central portion of the multi-controller 65. A stop-down button 83 is an operation button that is located in a position where it can be operated in a state where a user is holding the digital camera 100 while grasping a grip unit 90, and is an operation member that issues an instruction for reducing the aperture of a diaphragm 1 to reflect a diaphragm setting value based on the user settings. Note that the stop-down button 83 may be included in an interchangeable lens (a lens unit 150, which will be described later), rather than being configured to be included in a main body of the digital camera 100.

A moving image button 76 is used to issue an instruction for starting and stopping the shooting (recording) of moving images. An AE lock button 77 is a push button; an exposure state can be fixed by depressing the AE lock button 77 in a shooting standby state. A magnification button 78 is an operation button for switching between ON and OFF of a magnification mode during live-view display (LV display) in a shooting mode. A live-view image (LV image) can be magnified or reduced by operating the main electronic dial 71 while the magnification mode is ON. The magnification button 78 also functions as an AF frame movement start instruction button for making a transition to a state where the position of an AF frame is movable (an AF frame selection screen). In a reproduction mode, the magnification button 78 functions as an operation button for magnifying a reproduced image and increasing the magnification rate thereof. A reproduction button 79 is an operation button for switching between the shooting mode and the reproduction mode. Depressing the reproduction button 79 during the shooting mode makes a transition to the reproduction mode; as a result, among the images recorded in a recording medium 200 (described later), the newest image can be displayed on the display unit 28. A menu button 81 is a push button that is used to perform an instruction operation for displaying a menu screen; pushing the menu button 81 will display, on the display unit 28, the menu screen that enables various types of settings to be configured. The user can intuitively configure various types of settings with use of the menu screen displayed on the display unit 28, the four-direction key 74, and the SET button 75.

A touch bar 82 (multi-function bar, or M-Fn bar) is a linear touch operation member (line touch sensor) that can accept a touch operation. The touch bar 82 is located in a position where it can be touch-operated (touched) by the thumb of the right hand in a state where the right hand (the little finger, ring finger, and middle finger of the right hand) is grasping the grip unit 90 in such a manner that the pointing finger of the right hand can depress the shutter button 61. That is to say, the touch bar 82 is located in a position where it can be operated in a state where the user is positioned to be able to depress the shutter button 61 anytime while looking through a viewfinder with his/her eye in proximity to an eye proximity unit 16 (a shooting posture). The touch bar 82 is an acceptance unit that can accept, for example, a tap operation (an operation of touching and then releasing within a predetermined period without moving) and a leftward/rightward slide operation (an operation of touching and then moving the touched position while maintaining the touch) on the touch bar 82. The touch bar 82 is an operation member different from the touchscreen 70a, and does not have a display function.

A communication terminal 10 is a communication terminal that allows the digital camera 100 to communicate with the lens unit 150 side. The eye proximity unit 16 is an eye proximity unit for an eye proximity viewfinder 17 (look-through viewfinder); the user can visually recognize the video displayed on an internal EVF 29 (Electronic View Finder) via the eye proximity unit 16. An eye proximity detection unit 57 is an eye proximity detection sensor that detects whether an eye of the user (photographer) is in proximity to the eye proximity unit 16. A cover 202 is a cover for a slot that houses the recording medium 200 (described later). The grip unit 90 is a holding unit with a shape that is easily grasped by the right hand while the user is holding the digital camera 100. The shutter button 61 and the main electronic dial 71 are located in the positions where they can be operated by the pointing finger of the right hand in a state where the digital camera 100 is held while the grip unit 90 is being grasped by the little finger, ring finger, and middle finger of the right hand. Furthermore, the sub electronic dial 73 and the touch bar 82 are located in the positions where they can be operated by the thumb of the right hand in the same state. A thumb rest unit 91 (thumb standby position) is a grip member provided in a section which is on the rear surface side of the digital camera 100 and in which the thumb of the right hand grasping the grip unit 90 easily rests without operating any operation member. The thumb rest unit 91 is made up of, for example, a rubber member for increasing a holding force (grip feeling).

<Exemplary Functional Configuration of Digital Camera 100>

Figure 2:
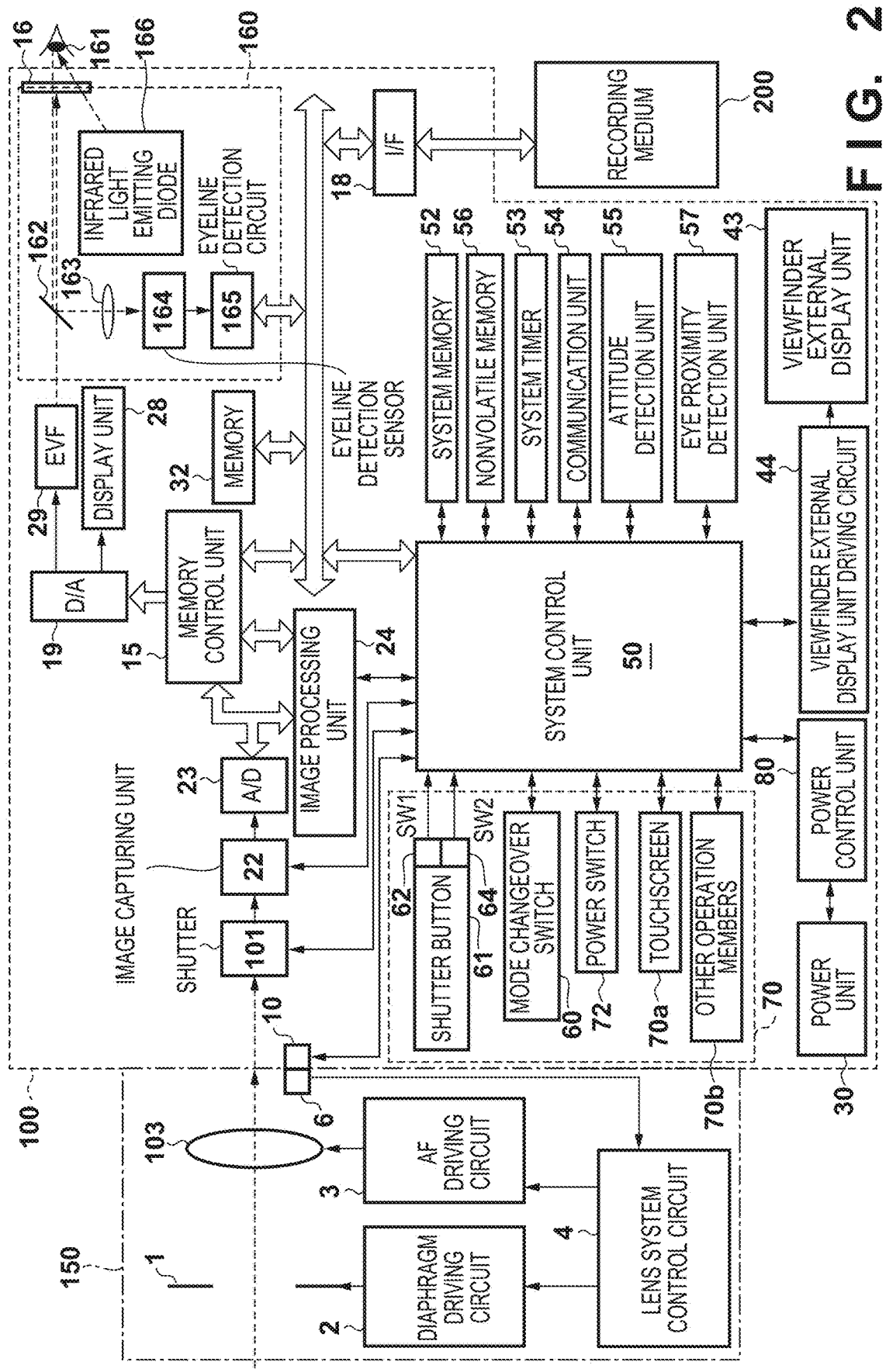
FIG. 2 is a block diagram showing an exemplary functional configuration of the digital camera according to the present embodiment.

FIG. 2 shows an exemplary functional configuration of the digital camera 100. A lens unit 150 is a lens unit on which an interchangeable photographing lens is mounted. A lens 103 is normally composed of a plurality of lenses, but is represented as only one lens in FIG. 2 for simplicity. A communication terminal 6 is a communication terminal that allows the lens unit 150 to communicate with the digital camera 100 side, and a communication terminal 10 is a communication terminal that allows the digital camera 100 to communicate with the lens unit 150 side. The lens unit 150 communicates with a system control unit 50 via these communication terminals 6, 10. Also, the lens unit 150 causes an internal lens system control circuit 4 to control the diaphragm 1 via a diaphragm driving circuit 2. Furthermore, the lens unit 150 achieves a focused state by causing the lens system control circuit 4 to displace the position of the lens 103 via an AF driving circuit 3.

A shutter 101 is a focal-plane shutter that can freely control the exposure period of an image capturing unit 22 under control of the system control unit 50.

The image capturing unit 22 is an image capturing element (image sensor) composed of, for example, a CCD or CMOS element that converts an optical image into electrical signals. The image capturing unit 22 may include an image capturing surface phase-difference sensor that outputs defocus amount information to the system control unit 50. An A/D converter 23 converts analog signals output from the image capturing unit 22 into digital signals.

An image processing unit 24 performs predetermined processing (e.g., pixel interpolation, resizing processing including reduction, and color conversion processing) with respect to data from the A/D converter 23, or data from a memory control unit 15. The image processing unit 24 also performs predetermined computation processing with use of captured image data, and the system control unit 50 performs exposure control and ranging control based on the computation result obtained by the image processing unit 24. As a result, for example, AF (autofocus) processing, AE (automatic exposure) processing, and EF (preliminary flash emission) processing of the TTL (through-the-lens) method are performed. The image processing unit 24 further performs predetermined computation processing with use of captured image data, and performs AWB (auto white balance) processing of the TTL method based on the obtained computation result.

Output data from the A/D converter 23 is written into a memory 32 via the image processing unit 24 and the memory control unit 15. Alternatively, output data from the A/D converter 23 is written into the memory 32 via the memory control unit 15 without intervention of the image processing unit 24. The memory 32 stores image data that has been obtained by the image capturing unit 22 and converted into digital data by the A/D converter 23, and image data to be displayed on the display unit 28 and the EVF 29. The memory 32 has a storage capacity sufficient to store a predetermined number of still images, as well as moving images and audio of a predetermined duration.

The memory 32 also functions as a memory for image display (video memory). A D/A converter 19 converts data for image display stored in the memory 32 into analog signals, and supplies the analog signals to the display unit 28 and the EVF 29. Image data for display that has been written into the memory 32 in the foregoing manner is displayed by the display unit 28 and the EVF 29 via the D/A converter 19. Each of the display unit 28 and the EVF 29 is a display, such as an LCD and an organic EL, and performs display in accordance with the analog signals from the D/A converter 19. Digital signals that have undergone A/D conversion in the A/D converter 23 and accumulated in the memory 32 are converted into analog signals by the D/A converter 19, and sequentially transferred to and displayed by the display unit 28 or the EVF 29; in this way, live-view display (LV) can be performed. Hereinafter, images that are displayed in the form of live-view display will be referred to as live-view images (LV images).

The system control unit 50 is a control unit composed of at least one processor and/or at least one circuit, and controls the entirety of the digital camera 100. The system control unit 50 is a processor and is also a circuit. The system control unit 50 realizes each processing of the present embodiment, which will be described later, by executing a program recorded in a nonvolatile memory 56. Furthermore, the system control unit 50 also performs display control by controlling the memory 32, the D/A converter 19, the display unit 28, the EVF 29, and the like.

A system memory 52 is, for example, a RAM, and the system control unit 50 deploys constants and variables for the operations of the system control unit 50, the program that has been read out from the nonvolatile memory 56, and the like to the system memory 52.

The nonvolatile memory 56 is an electrically erasable and recordable memory, and is, for example, an EEPROM and the like. For example, the constants and program for the operations of the system control unit 50 are recorded in the nonvolatile memory 56. The program mentioned here denotes a program for executing various types of flowcharts, which will be described later in the present embodiment. A system timer 53 is a time measurement unit that measures the times used in various types of control and the time of a built-in clock.

A communication unit 54 transmits/receives video signals and audio signals to/from an external device that is connected wirelessly or via a wired cable. The communication unit 54 can connect also to a wireless LAN (Local Area Network) and the Internet. Furthermore, the communication unit 54 can communicate with an external device also via Bluetooth® and Bluetooth Low Energy. The communication unit 54 can transmit images captured by the image capturing unit 22 (including LV images) and images recorded in the recording medium 200, and can receive image data and other various types of information from an external device.

An attitude detection unit 55 detects the attitude of the digital camera 100 relative to the direction of gravity. Based on the attitude detected by the attitude detection unit 55, it is possible to distinguish whether an image shot by the image capturing unit 22 is an image that was shot while the digital camera 100 was held in a landscape orientation or an image that was shot while the digital camera 100 was held in a portrait orientation. The system control unit 50 can add direction information corresponding to the attitude detected by the attitude detection unit 55 to an image file of an image captured by the image capturing unit 22, and record an image in a rotated state. For example, an acceleration sensor or a gyroscope can be used as the attitude detection unit 55. A motion of the digital camera 100 (e.g., panning, tilting, lifting, and whether the digital camera 100 is stationary) can also be detected using the acceleration sensor or the gyroscope acting as the attitude detection unit 55.

The eye proximity detection unit 57 is an eye proximity detection sensor that detects approaching and separation (eye proximity and eye separation) of an eye (object) to and from and the eye proximity unit 16 of the eye proximity viewfinder 17 (hereinafter simply referred to as a "viewfinder") (approach detection). The system control unit 50 switches between display (a display state) and non-display (a non-display state) on the display unit 28 and the EVF 29 in accordance with the state detected by the eye proximity detection unit 57. More specifically, in a case where the digital camera 100 is at least in a shooting standby state and the setting of display destination switchover is automatic switchover, while the eye is not in proximity, the display unit 28 is used as a display destination and its display is turned ON, and the EVF 29 is placed in the non-display state. On the other hand, while the eye is in proximity, the EVF 29 is used as the display destination and its display is turned ON, and the display unit 28 is placed in the non-display state. For example, an infrared proximity sensor can be used as the eye proximity detection unit 57, in which case approaching of some sort of object to the eye proximity unit 16 of the eye proximity viewfinder 17 with the built-in EVF 29 can be detected. When an object has approached, infrared light emitted from a light emission unit (not shown) of the eye proximity detection unit 57 is reflected by the object and received by a light receiving unit (not shown) of the infrared proximity sensor. Based on the amount of the received infrared light, it is also possible to discern the distance between the approaching object and the eye proximity unit 16 (the eye proximity distance). In the foregoing manner, the eye proximity detection unit 57 performs eye proximity detection whereby the distance between the approaching object and the eye proximity unit 16 is detected. It is assumed that eye proximity is detected in a case where an approaching object has been detected at or within a predetermined distance from the eye proximity unit 16 in a non-eye proximity state (non-approach state). It is assumed that eye separation is detected in a case where the object that was detected as the approaching object has separated by a predetermined distance or more in an eye proximity state (approach state). A threshold for detection of eye proximity and a threshold for detection of eye separation may be different from each other when, for example, hysteresis is used. Furthermore, it is assumed that the detection of eye proximity is followed by the eye proximity state, until eye separation is detected. It is assumed that the detection of eye separation is followed by the non-eye proximity state, until eye proximity is detected. Note that the infrared proximity sensor is one example, and another sensor may be used as the eye proximity detection unit 57 as long as it can detect a state that can be regarded as eye proximity.

The viewfinder external display unit 43 displays a variety of setting values of the camera related to a shutter speed, the diaphragm, and the like via a viewfinder external display unit driving circuit 44. A power control unit 80 is composed of, for example, a battery detection circuit, a DC-DC converter, and a switch circuit for switching among the blocks to which current is supplied, and detects whether a battery is loaded, a battery type, and a remaining battery power, for example. The power control unit 80 also controls the DC-DC converter based on the results of the foregoing detection and an instruction from the system control unit 50, and supplies a necessary voltage for a necessary period to respective components, including the recording medium 200. A power unit 30 is composed of, for example, a primary battery (e.g., an alkaline battery and a lithium battery), a secondary battery (e.g., a NiCd battery, a NiMH battery, and a lithium-ion battery), or an AC adapter.

A recording medium I/F 18 is an interface with the recording medium 200, which is a memory card, a hard disk, or the like. The recording medium 200 is a memory card or a similar recording medium for recording shot images, and is composed of a semiconductor memory, a magnetic disk, or the like.

An operation unit 70 is an input unit that accepts an operation from the user (user operation), and is used to input various types of operational instructions to the system control unit 50. As shown in FIG. 2, the operation unit 70 includes the shutter button 61, the mode changeover switch 60, the power switch 72, the touchscreen 70a, other operation members 70b, and the like. Other operation members 70b include, for example, the main electronic dial 71, the sub electronic dial 73, the four-direction key 74, the SET button 75, the moving image button 76, the AE lock button 77, the magnification button 78, and the reproduction button 79. Furthermore, other operation members 70b may include the menu button 81, the touch bar 82, the MC 65, the stop-down button 83, and the like.

The shutter button 61 includes a first shutter switch 62 and a second shutter switch 64. The first shutter switch 62 is turned ON and generates a first shutter switch signal SW1 partway through an operation performed on the shutter button 61, that is to say, when the shutter button 61 is depressed halfway (a shooting preparation instruction). Based on the first shutter switch signal SW1, the system control unit 50 starts shooting preparation operations, such as AF (autofocus) processing, AE (automatic exposure) processing, AWB (auto white balance) processing, and EF (preliminary flash emission) processing.

The second shutter switch 64 is turned ON and generates a second shutter switch signal SW2 upon completion of the operation performed on the shutter button 61, that is to say, when the shutter button 61 is fully depressed (a shooting instruction). Based on the second shutter switch signal SW2, the system control unit 50 starts the operations of a shooting processing sequence, from reading of signals from the image capturing unit 22 to writing of a captured image as an image file into the recording medium 200.

The mode changeover switch 60 changes an operation mode of the system control unit 50 to one of a still image shooting mode, a moving image shooting mode, a reproduction mode, and so forth. Examples of modes included in the still image shooting mode include an auto shooting mode, an auto scene distinction mode, a manual mode, a diaphragm priority mode (Av mode), a shutter speed priority mode (Tv mode), and a program AE mode (P mode). They also include various types of scene modes in which shooting settings are configured on a scene-by-scene basis, a custom mode, and the like. The mode changeover switch 60 enables the user to switch directly to one of these modes. Alternatively, after switching to a screen showing the list of shooting modes with use of the mode changeover switch 60, another operation member may be used to selectively switch to one of the plurality of modes being displayed. Similarly, the moving image shooting mode may also include a plurality of modes.

The touchscreen 70a is a touch sensor that detects various types of touch operations performed on the display surface of the display unit 28 (an operation surface of the touchscreen 70a). The touchscreen 70a and the display unit 28 can be configured as an integrated unit. For example, the touchscreen 70a is configured to have a light transmittance that does not interfere with display performed by the display unit 28, and is attached to a top layer of the display surface of the display unit 28. Also, input coordinates of the touchscreen 70a are associated with display coordinates on the display surface of the display unit 28. This makes it possible to provide a GUI (graphical user interface) on which the user can operate a screen displayed on the display unit 28 as if directly.

The system control unit 50 can detect the following operations or states with respect to the touchscreen 70a.

Newly touching the touchscreen 70a with a finger or a stylus that was not touching the touchscreen 70a, that is to say, the start of a touch (hereinafter referred to as "touch-down")

A state where a finger or a stylus is touching the touchscreen 70a (hereinafter referred to as "touch-on")

Movement of a finger or a stylus while it is touching the touchscreen 70a (hereinafter referred to as "touch-move")

Separation (releasing) of a finger or a stylus that was touching the touchscreen 70a from the touchscreen 70a, that is to say, the end of a touch (hereinafter referred to as "touch-up")

A state where nothing is touching the touchscreen 70a (hereinafter referred to as "touch-off")

When a touch-down is detected, a touch-on is detected at the same time. After a touch-down, a touch-on normally continues to be detected as long as no touch-up is detected. Also, in a case where a touch-move is detected, a touch-on is detected at the same time. Even when a touch-on is detected, a touch-move is not detected as long as the touched position does not move. A touch-off follows the detection of a touch-up of all fingers or styluses that were touching.

The system control unit 50 is notified of these operations and states, as well as positional coordinates at which a finger or a stylus is touching the touchscreen 70a, via an internal bus. Then, the system control unit 50 determines what kind of operation (touch operation) has been performed on the touchscreen 70a based on information it has been notified of. With regard to a touch-move, the movement direction of a finger or a stylus moving on the touchscreen 70a can also be determined, for each of a vertical component and a horizontal component on the touchscreen 70a, based on a change in the positional coordinates. It is determined that a slide operation has been performed in a case where a touch-move of a predetermined distance or longer has been detected. An operation of quickly moving a finger by a certain distance while the finger is touching the touchscreen 70a and then releasing the finger is called a flick. In other words, a flick is a quick tracing operation of swiping a finger across the touchscreen 70a. It can be determined that a flick has been performed when a touch-up is detected immediately after the detection of a touch-move of a predetermined distance or longer at a predetermined speed or faster (it can be determined that a flick has been performed following a slide operation). Furthermore, in a case where a plurality of locations (e.g., two points) are touched at the same time (multi-touch), a touch operation of bringing the touched positions closer to each other is called a pinch-in, whereas a touch operation of moving the touched positions apart from each other is called a pinch-out. A pinch-out and a pinch-in are collectively referred to as a pinch operation (or simply a pinch). The touchscreen 70a may be based on any of a variety of types of touchscreens, such as a resistive film type, a capacitance type, a surface acoustic wave type, an infrared type, an electromagnetic induction type, an image recognition type, and an optical sensor type. There are a type in which a touch is detected when contact is made with the touchscreen, and a type in which a touch is detected when a finger or a stylus has approached the touchscreen; either type may be used.

An eyeline detection block 160 is a block for detecting an eyeline that indicates whether the user who has brought his/her eye in proximity to the eye proximity unit 16 is viewing the EVF 29, and also indicates which position is being viewed in a case where the user is viewing the EVF 29. The eyeline detection block 160 includes a dichroic mirror 162, an image forming lens 163, an eyeline detection sensor 164, an infrared light emission diode 166, and an eyeline detection circuit 165.

The infrared light emission diode 166 is a light emission element, and irradiates the user's eyeball (eye) 161 that is in proximity to the eye proximity unit 16 with infrared light. The infrared light emitted from the infrared light emission diode 166 is reflected by the eyeball (eye) 161, and the reflected infrared light arrives at the dichroic mirror 162. The dichroic mirror 162 reflects only infrared light, and allows visible light to be transmitted therethrough. The reflected infrared light that has been changed in terms of the optical path forms an image on an image capturing surface of the eyeline detection sensor 164 via the image forming lens 163. The image forming lens 163 is an optical element that composes an eyeline detection optical system. The eyeline detection sensor 164 is composed of an image capturing device, such as a CCD-type image sensor. The eyeline detection sensor 164 photoelectrically converts the reflected infrared light that has been incident thereon into electrical signals, and outputs the electrical signals to the eyeline detection circuit 165. The eyeline detection circuit 165 includes at least one processor, detects the position of the eyeline of the user from an image or a movement of the users eyeball (eye) 161 based on the signals output from the eyeline detection sensor 164, and outputs detected information to the system control unit 50.

In the present embodiment, for example, the eyeline is detected based on a method called a corneal reflection method with use of the eyeline detection block 160. The corneal reflection method is a method of detecting the direction and the position of the eyeline from a positional relationship between reflected light, which is obtained as a result of infrared light emitted from the infrared light emission diode 166 reflecting off the eyeball (eye) 161, especially the cornea, and the pupil of the eyeball (eye) 161. In addition, there are a variety of methods of detecting the direction and the position of the eyeline, such as a method called a sclera reflection method, which makes use of the difference in light reflectance between the black part and the white part of the eye. Note that an eyeline detection method other than the foregoing methods may be used as long as it can detect the direction and the position of the eyeline. The present embodiment has been described under the assumption that the light emission unit and the light receiving unit of the eye proximity detection unit 57 are devices that are separate from the above-described infrared light emission diode 166 and eyeline detection sensor 164. However, no limitation is intended by this, and the infrared light emission diode 166 and the eyeline detection sensor 164 may also function as the light emission unit and the light receiving unit of the eye proximity detection unit 57, respectively.

The system control unit 50 can detect the following operations or states based on the output from the eyeline detection block 160.

New input (detection) of an eyeline of the user who has brought his/her eye in proximity to the eye proximity unit 16; that is to say, the start of eyeline input A state where the user who has brought his/her eye in proximity to the eye proximity unit 16 is performing eyeline input A state where the user who has brought his/her eye in proximity to the eye proximity unit 16 is gazing Deflection of the eyeline that was input by the user who has brought his/her eye in proximity to the eye proximity unit 16; that is to say, the end of eyeline input A state where no eyeline input is performed by the user who has brought his/her eye in proximity to the eye proximity unit 16

Gazing mentioned here can be a condition in which the user continues to view substantially the same position for a certain period. Regarding the determination of whether the user is gazing, for example, it is determined that the user has gazed in a case where the position of the eyeline of the user has not exceeded a predetermined movement amount for a predetermined period (e.g., approximately 0.5 seconds). Note that the predetermined period may be a period that can be set by the user, may be a fixed period that has been determined in advance, or may vary depending on a distance relationship between the position of the immediately preceding eyeline and the position of the current eyeline. For example, based on the detected information received from the eyeline detection circuit 165, the system control unit 50 determines that the user is gazing in a case where a period of continuation of a state where the eyeline of the user remains detected at substantially the same position (a state where the eyeline makes no movement) has exceeded the predetermined period (threshold period). Also, the system control unit 50 determines that the eyeline is in a state where it is making no movement in a case where, for example, the average position of the detected positions of the eyeline within a short period including the latest detection timing (≤the foregoing threshold period) falls within a predetermined range and the variation (dispersion) in the detected positions is smaller than a predetermined value.

The user can set one of absolute position designation and relative position designation as a method of designating the position of a position indicator in a case where a touch-move operation has been performed on the touchscreen 70a in the eye proximity state. For example, provided that the position indicator is an AF frame, in the case of absolute position designation, when the touchscreen 70a is touched, a focus adjustment position associated with the touched position (the position of the coordinate input) is set. That is to say, the positional coordinates at which the touch operation was performed is associated with the positional coordinates of the display unit 28. In the case of absolute position designation, when the touchscreen 70a is touched, the AF frame moves to the position associated with the touched position, irrespective of the focus adjustment position before the touch. On the other hand, in the case of relative position designation, the positional coordinates at which the touch operation was performed is not associated with the positional coordinates of the display unit 28. In the case of relative position designation, the touched position is moved from the currently set focus adjustment position by a distance corresponding to the movement amount of the touch-move in the movement direction of the touch-move, irrespective of the touch-down position on the touchscreen 70a. That is to say, in the case of relative position designation, the focus adjustment position that was set before the touch-down is not moved only by the occurrence of the touch-down. If the touch-move is performed thereafter, the focus adjustment position is moved from the position of the focus adjustment position before the touch-down by the movement amount corresponding to the distance and the movement direction of the touch-move.

Types of the AF frame include single-point AF, face+tracking priority AF, and zone AF. Single-point AF is suitable for use in a scene in which it is desired to perform pinpoint AF on the position intended by the user. Face+tracking priority AF is suitable for use in a scene in which it is desired to perform AF on a subject detected by the camera among the entirety of the AF-capable region. Zone AF is suitable for use in a scene in which it is desired to broadly capture a subject as a region. These can be changed under a setting item called an AF method.

<Sequence of Operations of Main Processing>

Figure 3B:
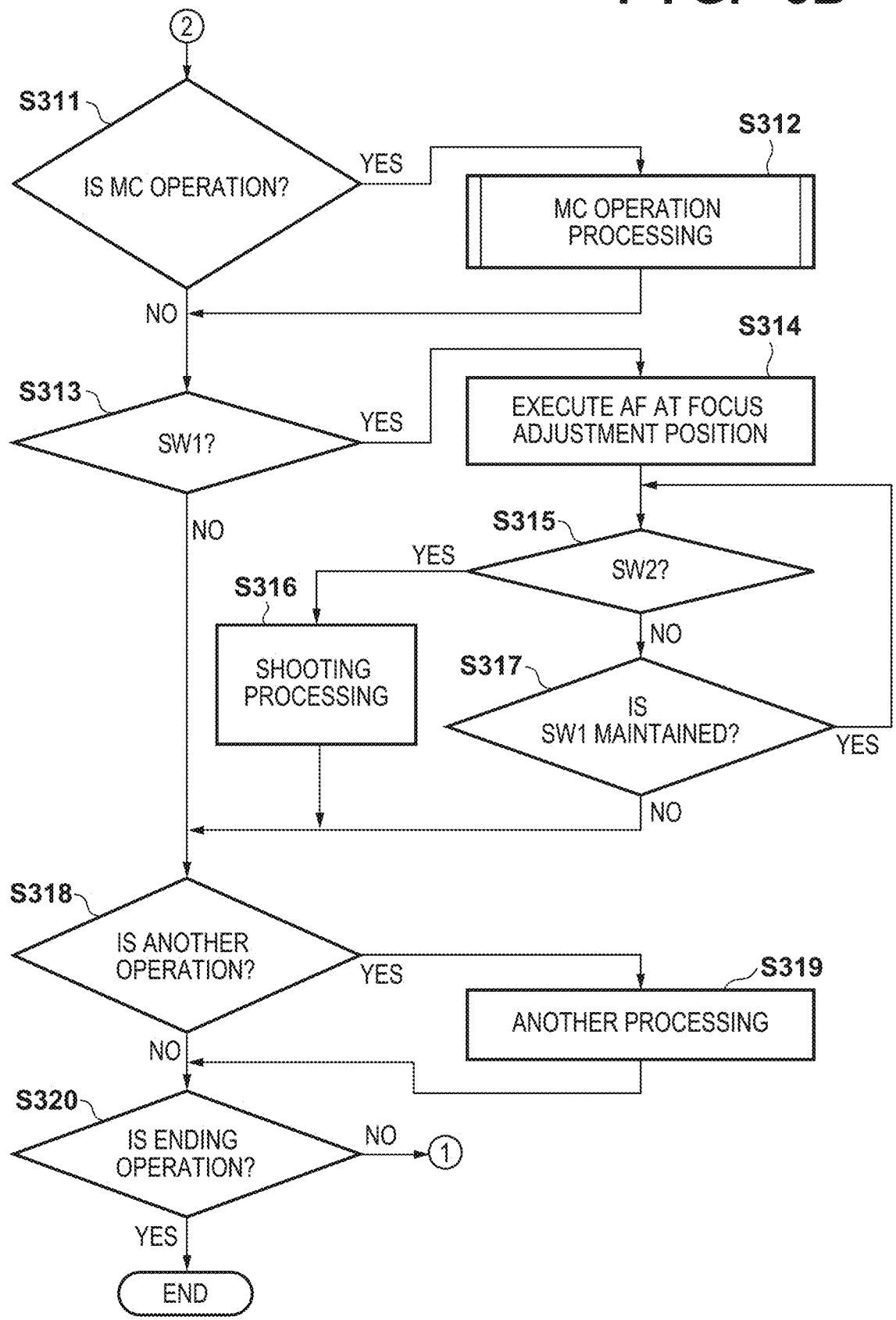

Next, with reference to FIGS. 3A and 3B, a description is given of a sequence of operations of main processing related to shooting mode processing executed in the digital camera 100. Note that the present processing is realized by the system control unit 50 deploying the program stored in the nonvolatile memory 56 to a working area of the system memory 52 and executing the program.

In step S301, the system control unit 50 determines whether an operation of switching the exposure simulation (or exposure Simulation) setting has been performed on the operation unit 70. An exposure Simulation function is a function of displaying, on the display unit, an LV image simulating the brightness that reflects the exposure value set by the user. With use of the exposure Simulation function, what kind of image will be shot (e.g., in a case where the user has set, for example, underexposure) can be confirmed via the displayed LV image before shooting. In a case where the system control unit 50 determines that this switching operation has been performed based on a signal from the operation unit 70, processing proceeds to step S302; otherwise, processing proceeds to step S303.

In step S302, the system control unit 50 changes a setting value of the digital camera 100 based on the operation performed in step S301 in relation to the exposure Simulation setting. At this time, the system control unit 50 records the changed setting value into the nonvolatile memory 56. More specifically, for example, the system control unit 50 displays a menu screen 400 shown in FIG. 4A in response to depression of the menu button 81. This menu screen 400 is a screen that displays a plurality of setting items that can be configured, including the "exposure Simulation" setting. For example, when the user selects an item of exposure Simulation among the plurality of setting items (e.g., touches the touchscreen at the position of the item of exposure Simulation), the options for setting contents related to the exposure Simulation setting shown in FIG. 4B are displayed. The setting contents that can be configured under the exposure Simulation setting include, for example, the settings of "yes", "yes during stop-down", and "no". In a case where the "yes" setting (setting 401) is selected under the exposure Simulation setting, the system control unit 50 performs display in a display mode in which the display unit 28 displays an LV image with brightness that reflects the exposure settings. Also, in a case where the "during stop-down" setting (setting 402) is selected, the system control unit 50 performs display in a display mode in which an LV image is displayed with brightness that reflects the settings only while the stop-down button 83 is depressed. On the other hand, while the stop-down button 83 is not depressed, display is performed in a display mode in which an LV image is displayed with brightness corresponding to a photometry result that is not relevant to the exposure settings (e.g., brightness under appropriate exposure). In a case where the "no" setting (setting 403) is configured, the system control unit 50 performs display in a display mode in which exposure Simulation is not performed (i.e., an LV image is displayed with brightness that is not relevant to the exposure settings).

In step S303, the system control unit 50 determines whether an operation of switching the continuous AF setting has been performed on the operation unit 70. In a case where the system control unit 50 determines that the operation of switching the continuous AF setting has been performed, processing proceeds to step S304; otherwise, processing proceeds to step S303. In step S304, the system control unit 50 changes a setting value of the digital camera 100 based on the user operation performed in step S303, and records the changed setting value into the nonvolatile memory 56.

In step S305, the system control unit 50 determines whether an operation of switching the AF method setting has been performed on the operation unit 70. In a case where the system control unit 50 determines that this switching operation has been performed, processing proceeds to step S306; otherwise, processing proceeds to step S307. In step S306, the system control unit 50 changes a setting value related to the AF method of the digital camera 100 based on the operation performed in step S305, and records the changed setting value into the nonvolatile memory 56.

In step S307, the system control unit 50 determines whether a touch-down operation has been performed on the touchscreen 70a. In a case where the system control unit 50 determines that the touch-down operation has been performed, processing proceeds to step S308; otherwise, processing proceeds to step S309. In step S308, the system control unit 50 executes touch processing corresponding to the touch operation. The touch processing will be described later with reference to FIGS. 5A and 5B.

In step S309, the system control unit 50 determines whether an operation of making a transition to an AF frame selection screen (a state where the AF execution position is movable) has been performed. Specifically, the system control unit 50 determines whether the magnification button 78 has been depressed in accordance with a signal from the operation unit 70. In a case where the system control unit 50 determines that the magnification button 78 has been depressed (in a case where the operation of making a transition to the AF frame selection screen has been performed), processing proceeds to step S310; otherwise, processing proceeds to step S311.

In step S310, the system control unit 50 executes AF frame selection screen processing. The AF frame selection screen processing will be described later with reference to FIG. 7.

In step S311, the system control unit 50 determines whether a directional instruction operation has been performed on the MC 65. In a case where the directional instruction operation has been performed on the MC 65, processing proceeds to step S312; otherwise, processing proceeds to step S313. In step S312, the system control unit 50 executes MC operation processing. The MC operation processing will be described later with reference to FIGS. 8A and 8B.

In step S313, the system control unit 50 determines whether SW1 has been turned ON by depressing the shutter button 61 halfway. In a case where the system control unit 50 determines that SW1 has been turned ON, processing proceeds to step S314; otherwise, processing proceeds to step S318. In step S314, the system control unit 50 executes AF at the current focus adjustment position. In step S315, the system control unit 50 determines whether SW2 has been turned ON by fully depressing the shutter button 61. In a case where the system control unit 50 determines that SW2 has been turned ON, processing proceeds to step S316; otherwise, processing proceeds to step S317. In step S316, the system control unit 50 performs shooting processing that includes the execution of exposure by configuring (adjusting and driving) shooting parameters (e.g., the diaphragm, shutter speed, and ISO film speed) according to the way they have been set, and recording of a captured image into the recording medium 200 as an image file. In step S317, the system control unit 50 determines whether the ON state of SW1 (i.e., the state where the shutter button 61 is depressed halfway) is maintained; processing returns to step S315 in a case where it is determined that the ON state of SW1 is maintained, and processing proceeds to step S318 otherwise.

In step S318, the system control unit 50 determines whether another operation has been performed on the operation unit 70. In a case where the system control unit 50 determines that another operation has been performed, processing proceeds to step S319; otherwise, processing proceeds to step S320. In step S319, the system control unit 50 performs processing corresponding to another operation that has been determined to be performed. Examples of processing corresponding to another operation include changing of the diaphragm value in response to an operation of adjusting the diaphragm value, and changing of an exposure compensation value in response to an operation of changing the exposure compensation value. The examples may also include setting of the ISO film speed in response to an operation of setting the ISO film speed, changing of the shutter speed in response to an operation of setting the shutter speed, and the like. In addition, the examples of processing corresponding to another operation include a shooting setting operation of, for example, setting white balance in response to an operation of setting white balance, an operation of changing to a reproduction screen or a menu screen on the camera, and the like.

In step S320, the system control unit 50 determines whether an ending operation has been performed on the operation unit 70. For example, in a case where it is determined that a power-OFF operation or an operation of changing to an operation mode other than the shooting mode (e.g., the reproduction mode) has been performed, the system control unit 50 ends the sequence of operations of the present main processing; otherwise, the system control unit 50 returns to step S301 to repeat processing.

<Sequence of Operations of Touch Processing>

Figure 5A:
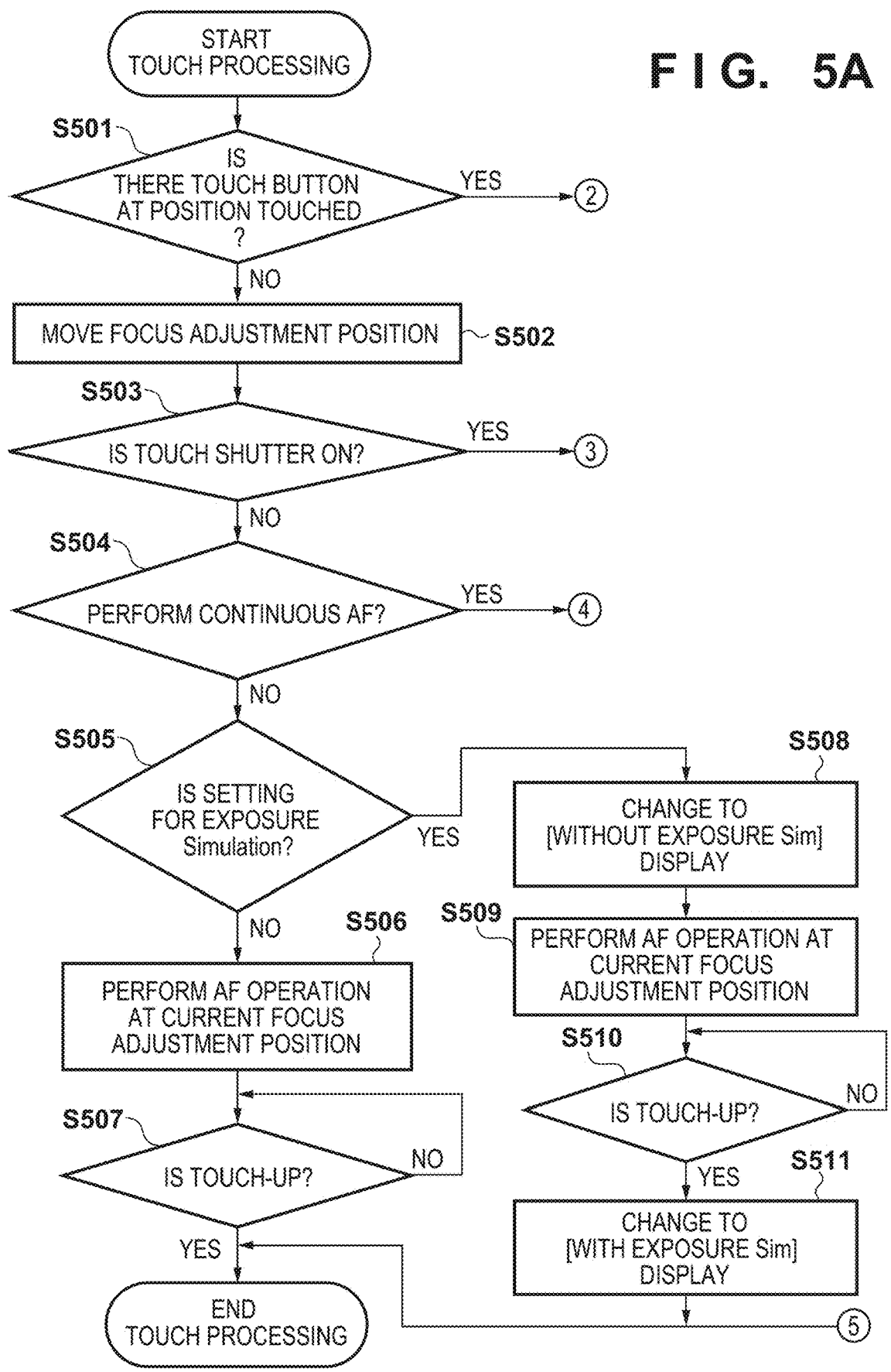

The following describes a sequence of operations of the touch processing in step S308 with reference to FIGS. 5A and 5B. Processing shown in FIGS. 5A and 5B is processing that represents one example of changing of a simulation display that is displayed on the display unit 28, which takes place after a touch-down operation is performed until a touch-up is performed in the present embodiment. Note that the present processing is realized by the system control unit 50 deploying the program stored in the nonvolatile memory 56 to a working area of the system memory 52 and executing the program, similarly to the processing shown in FIGS. 3A and 3B.

In step S501, the system control unit 50 determines whether there is a touch button at the position touched by the user. In a case where the system control unit 50 determines that there is a touch button at this touched position, processing proceeds to step S522; otherwise, processing proceeds to step S502. In step S502, the system control unit 50 moves a focus adjustment position indicating the AF execution position to the touched position.

In step S503, the system control unit 50 determines whether touch shutter ON is currently set. In a case where the system control unit 50 determines that touch shutter ON is currently set, processing proceeds to step S521; otherwise, processing proceeds to step S504.

In step S504, the system control unit 50 determines whether continuous AF is set to be performed. In a case where the system control unit 50 determines that continuous AF is set to be performed under the settings of the digital camera 100, processing proceeds to step S512; otherwise, processing proceeds to step S505.

In step S505, the system control unit 50 determines whether exposure Simulation is set to be performed under the current settings (the settings recorded in the nonvolatile memory 56). In a case where the system control unit 50 determines that, for example, "yes" (setting 401) is set as the exposure Simulation setting under the current settings, processing proceeds to step S508; otherwise, processing proceeds to step S506.

Note, with regard to the condition of step S505, which is the condition for temporarily cancelling exposure Simulation in step S508, whether the exposure value set by the user is within a range of specific thresholds may be additionally used as a determination condition in addition to the determination of whether exposure Simulation is set to be performed. For example, a condition in which the exposure value is equal to or larger than a threshold on the high luminance side (a high-key state where it is expected that the entire screen is so bright that it is difficult to view), or the exposure value is equal to or smaller than a threshold on the low luminance side (a low-key state where it is expected that the entire screen is so dark that it is difficult to view), may be additionally used as a determination condition. Alternatively, whether exposure Simulation display is currently performed (e.g., a case where the button is depressed with respect to the setting 402, which is "during stop-down") may be additionally used as a determination condition. That is to say, when an AF frame moving operation has been performed, exposure Simulation is cancelled in a case where the exposure value, which is determined based on the setting values that have been set in connection with exposure-related setting items, is equal to or larger than the threshold on the high luminance side. On the other hand, even when the AF frame moving operation has been performed, exposure Simulation is not cancelled in a case where the exposure value is smaller than the threshold on the high luminance side. Also, when the AF frame moving operation has been performed, exposure Simulation is cancelled in a case where the exposure value is equal to or smaller than the threshold on the low luminance side. On the other hand, even when the AF frame moving operation has been performed, exposure Simulation is not cancelled in a case where the exposure value is larger than the threshold on the low luminance side.

In step S506, the system control unit 50 performs an AF operation at the current focus adjustment position. In step S507, the system control unit 50 determines whether a touch-up operation has been performed on the touchscreen 70a. In a case where the system control unit 50 determines that the touch-up operation has been performed, the touch processing is ended; otherwise, processing of step S507 is repeated.

Figure 6A:
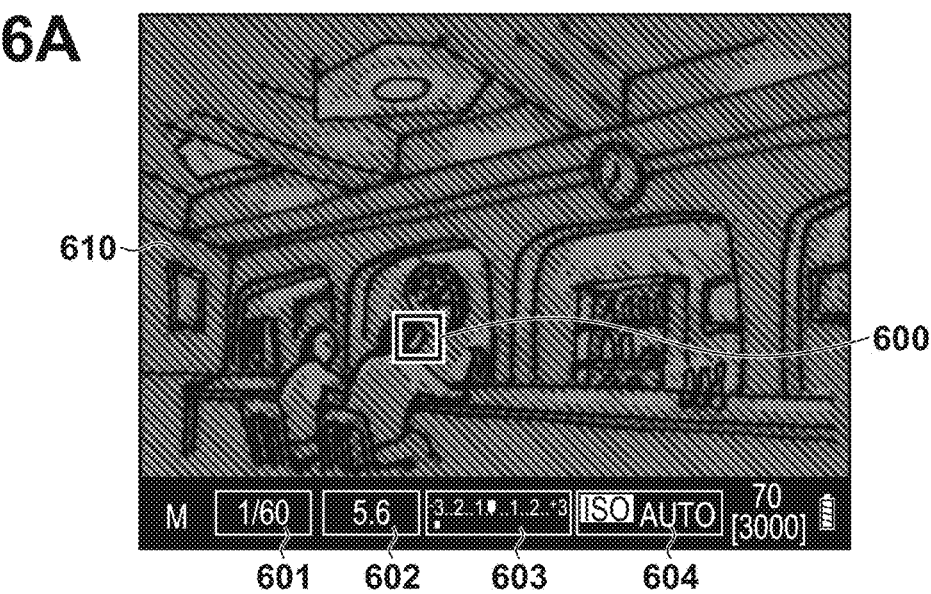
FIGS. 6A to 6C are diagrams showing examples of live-view display of the digital camera according to the present embodiment.
Figure 6B:
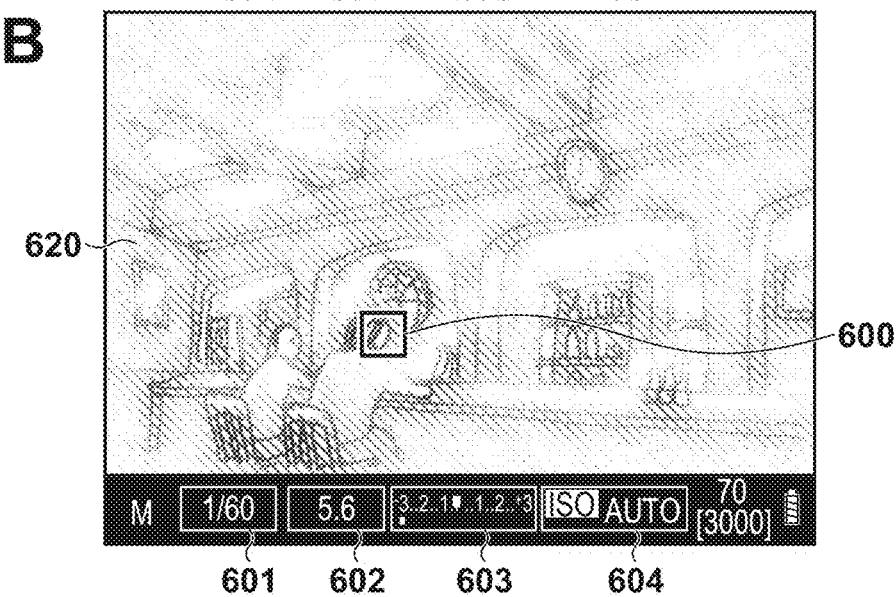

In step S508, the system control unit 50 changes the live-view image displayed on the display unit 28 so that the live-view image is displayed without exposure Simulation. That is to say, the system control unit 50 temporarily cancels (turns OFF) display with exposure Simulation. For example, when a touch-down is performed on the LV image in a state where display is performed as shown in FIG. 6A and FIG. 6B due to the ON state (activated state) of exposure Simulation, the system control unit 50 changes the display to display of FIG. 6C.

More specifically, examples of display of an LV image on the display unit 28 will be described. FIG. 6A shows an example of display for a case where exposure Simulation is ON in the case of an underexposure setting (low-key setting) with an exposure compensation of −3. When display is performed with exposure Simulation, an LV image is displayed with brightness that reflects the exposure settings configured by the user. As the exposure compensation set by the user is −3, simulation display of an LV image 610 is performed so that the image is darker than appropriate exposure. As the displayed LV image 610 is dark, although it is possible to confirm whether an image to be shot can present darkness, stateliness, and the like in agreement with the user's intention, it is difficult to confirm the details of subjects in dark areas. There is a possibility that dark areas include blocked-up shadows; if there are blocked-up shadows, it is even more difficult to confirm the details of subjects. Note that blocked-up shadows, too, may be the presentation intended by the user.

Display items 601 to 604 respectively indicate the shutter speed, f-number (diaphragm setting value), exposure compensation value, and ISO film speed that are currently set. Each of them also acts as a touch button (touch icon); when each of their positions is touched, the determination of step S501 leads to Yes, and an operation item for changing the setting of each setting value is displayed. Then, the setting value of each setting item can be changed by performing a touch operation on the displayed operation item.

An AF frame 600 is an indicator that indicates the position of the current AF frame (i.e., focus adjustment position). Upon accepting an AF instruction (e.g., SW1), which is an instruction for executing an AF function, the system control unit 50 executes AF with respect to a subject at the position indicated by the AF frame 600.

FIG. 6B shows an example of display for a case where exposure Simulation is ON in the case of an overexposure setting (high-key setting) with an exposure compensation of +3. When exposure Simulation is performed, display is performed with brightness that reflects the exposure settings configured by the user. As the exposure compensation set by the user is +3, simulation display of an LV image 620 is performed so that the image is brighter than appropriate exposure. Under this overexposure setting, the displayed LV image 620 is dark relative to this setting. Therefore, although the user can confirm whether an image to be shot can present, for example, brightness and a warm and soft atmosphere in agreement with the user's intention, it is difficult to confirm the details of subjects in bright areas. There is a possibility that bright areas include blown-out highlights; if there are blown-out highlights, it is even more difficult to confirm the details of subjects. Note that blown-out highlights, too, may be the presentation intended by the user.

Figure 6C:
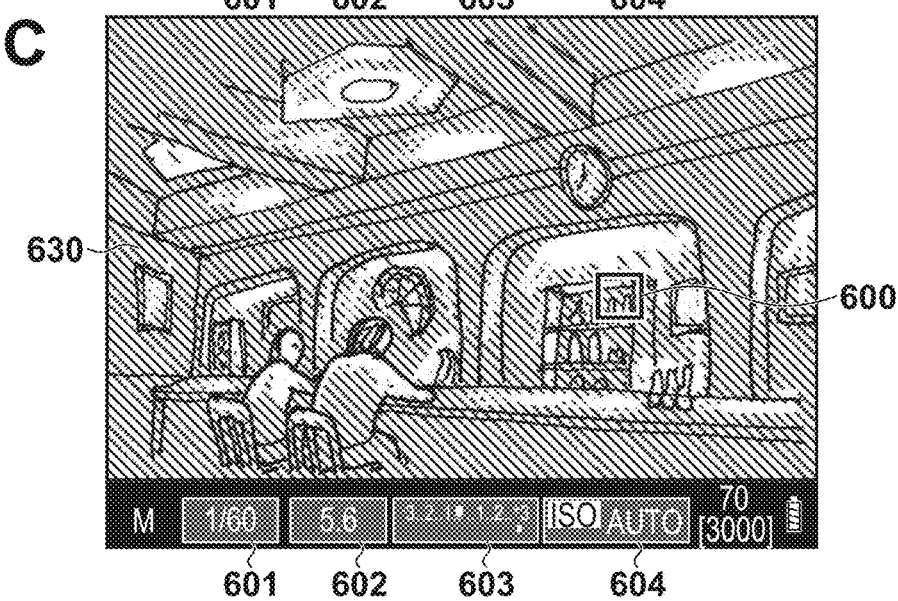

FIG. 6C shows an example of display for a case where a display mode with exposure Simulation is temporarily cancelled (turned OFF). Even if the setting value of exposure compensation set by the user is a setting value different from appropriate exposure (±0), an LV image 630 is displayed with brightness under appropriate exposure based on the photometry result obtained using a photometry method that is set. As a result, the details of subjects can be confirmed from dark areas to bright areas, and it becomes easy to confirm whether the AF frame 600 was able to be moved to the intended position among the subjects. Note, at this time, the exposure parameters that act as the factors for determining the exposure value, namely the shutter speed, diaphragm value, exposure compensation value, and ISO film speed are not reflected in the brightness of the LV image 630. Therefore, in order to indicate this, the display format of at least one of the display items 601 to 604, which indicate the setting values of these exposure parameters, is changed to a second display format different from a first display format for the cases of FIG. 6A and FIG. 6B. The second display format is, for example, a display format in which display is performed using a color different from the first display format, display is grayed out, the setting values are not displayed, the setting values are displayed as different values, and the like.

Note that the setting items related to the exposure value reflected in exposure Simulation may include not only the exposure compensation value, but also at least one of the settings of the shutter speed, diaphragm value, and ISO film speed.

In step S509, the system control unit 50 performs an AF operation at the current focus adjustment position. In step S510, the system control unit 50 determines whether a touch-up operation has been performed on the touchscreen 70a. In a case where the system control unit 50 determines that the touch-up operation has been performed, processing proceeds to step S511; otherwise, processing proceeds to step S510. Until the touch-up is performed, display is performed in a state where exposure Simulation display is temporarily cancelled (deactivated). Therefore, display is performed in such a manner that the subject status is easy to view irrespective of the state of the exposure parameter settings, and it is easy to confirm whether the focus adjustment position that has been set in response to the touch-down is a position that is in agreement with the user's intention. Note that the present embodiment has been described using an exemplary case where the display destination of an LV image is the display unit 28, and the focus adjustment position that has been determined based on the touch-down position is not moved in a case where continuous AF is not performed (in the case of one-shot AF), even if a touch-move has been performed. However, the focus adjustment position may be moved in response to a touch-move.

In step S511, the system control unit 50 changes the LV image displayed on the display unit 28 so that the LV image is displayed with exposure Simulation (display with exposure Simulation, which was temporarily cancelled, is restored to ON). That is to say, the above-described display of FIG. 6C is changed (restored) to the display of FIG. 6A and FIG. 6B. However, the AF frame 600 indicating the AF function execution position is displayed at the moved position. This makes it possible to confirm whether the AF frame was able to be set at the intended position during a touch-on, and then confirm what kind of brightness can be achieved by an image to be captured in the state of the current setting of the exposure compensation value simply by releasing the touch. Therefore, the brightness setting can also be adjusted by performing an operation of making an additional change as necessary. In this way, it is possible to easily shoot an image in which a subject intended by the user is focused and which has brightness intended by the user. Note, although step S511 has been described using an example in which exposure Simulation is immediately turned ON again in response to the touch-up, display with exposure Simulation may remain cancelled (display OFF) for a predetermined period (e.g., approximately two second) after the touch-up. In this case, exposure Simulation may be turned ON (restored to the original state) after the predetermined period has elapsed since the touch-up. There is a case where, while a touch is being performed on an LV image, a subject may be hidden behind a touching finger and difficult to view.

For this reason, keeping the exposure Simulation in the OFF state for the predetermined period after performing the touch-up to remove the shielding by the finger, makes it possible to confirm whether the AF frame 600 was able to be moved to the position of a target subject.

In step S512, the system control unit 50 determines whether exposure Simulation is set to be performed. In a case where the system control unit 50 determines that exposure Simulation is set to be performed, processing proceeds to step S516; otherwise, processing proceeds to step S513. Note that in step S512 also, whether the exposure value set by the user is within a range of specific thresholds may be additionally used as a determination condition in addition to the determination of whether exposure Simulation is set to be performed, similarly to step S505. Alternatively, whether exposure Simulation display is currently performed may be additionally used as a determination condition.

In step S513, the system control unit 50 determines whether a touch-move operation has been performed on the touchscreen 70a. In a case where the system control unit 50 determines that the touch-move operation has been performed, processing proceeds to step S515; otherwise, processing proceeds to step S514.

In step S514, the system control unit 50 determines whether a touch-up operation has been performed on the touchscreen 70a. In a case where the system control unit 50 determines that the touch-up operation has been performed, the touch processing is ended; otherwise, processing proceeds to step S513.

In step S515, the system control unit 50 moves the focus adjustment position to a position based on the touch-move performed in step S513. In step S516, the system control unit 50 changes the LV image displayed on the display unit 28 so that the LV image is displayed without exposure Simulation (display with exposure Simulation is temporarily cancelled), similarly to step S506. In a case where exposure Simulation is not performed, the LV image is displayed on the display unit 28 with brightness under approximate exposure based on the photometry result. As a result, the aforementioned display of FIG. 6A or FIG. 6B is changed to the display of FIG. 6C. Therefore, the details of subjects can be confirmed from dark areas to bright areas, and it becomes easy to confirm whether the AF frame 600 was able to be moved to the intended position among the subjects.

In step S517, the system control unit 50 determines whether a touch-move operation has been performed on the touchscreen 70a. In a case where the system control unit 50 determines that the touch-move operation has been performed, processing proceeds to step S520; otherwise, processing proceeds to step S518.

In step S518, the system control unit 50 determines whether a touch-up operation has been performed on the touchscreen 70a. In a case where the system control unit 50 determines that the touch-up operation has been performed, processing proceeds to step S519; otherwise, processing proceeds to step S517. In step S519, the system control unit 50 changes the live-view image displayed on the display unit 28 so that the live-view image is displayed with exposure Simulation (display with exposure Simulation, which was temporarily cancelled, is restored to ON), similarly to step S511. That is to say, the above-described display of FIG. 6C is changed (restored) to the display of FIG. 6A or FIG. 6B.

Note that exposure Simulation may not be immediately turned ON again in response to the touch-up, similarly to step S511. That is to say, display with exposure Simulation may remain cancelled (temporarily OFF) for the predetermined period (approximately two second) after the touch-up, and exposure Simulation may be turned ON (restored to the original state) after the predetermined period has elapsed since the touch-up.

In step S520, the system control unit 50 moves the focus adjustment position to a position based on the touch-move performed in step S517. Immediately after the focus adjustment position is moved, as exposure Simulation is temporarily deactivated, the LV image is easy to view, and it is easy to confirm whether the AF frame 600 was able to be moved to the intended position among subjects.

In step S521, the system control unit 50 performs AF at the current focus adjustment position, and carries out shooting. In step S522, the system control unit 50 performs processing for actuating the function of the touch button.

As described above, according to the present embodiment, while an LV image reflecting the set exposure value is displayed in the form of simulation display, simulation display is temporarily cancelled when the AF frame is moved via a touch operation. Then, during the cancellation, an LV image is displayed under appropriate exposure that is not relevant to the settings. This can make it easy to make an accurate change to the setting of the focus adjustment position, even during simulation display with the exposure value set by the user.

Note that the flow may be interrupted in mid-course in a case where an abnormal operation, such as rotation of a mode dial and the like during the execution of the present processing, is performed.

<Sequence of Operations of AF Frame Selection Screen Processing>

Furthermore, a description is now given of a sequence of operations of the AF frame selection screen processing in step S310 with reference to FIG. 7. FIG. 7 shows the operations of changing simulation display of an LV image displayed on the display unit 28, which take place after making a transition to the AF frame selection screen until the end of the AF frame selection screen in the present embodiment. Note that the present processing is realized by the system control unit 50 deploying the program stored in the nonvolatile memory 56 to a working area of the system memory 52 and executing the program, similarly to the processing shown in FIGS. 3A and 3B.

In step S701, the system control unit 50 determines whether exposure Simulation is set to be performed under the current settings (the settings recorded in the nonvolatile memory 56). In a case where the system control unit 50 determines that exposure Simulation is set to be performed, processing proceeds to step S705; otherwise, processing proceeds to step S702. Note that in step S701 also, whether the exposure value set by the user is within a range of specific thresholds may be additionally used as a determination condition in addition to the determination of whether exposure Simulation is set to be performed, similarly to step S505. Alternatively, whether exposure Simulation display is currently performed may be additionally used as a determination condition.

In step S702, the system control unit 50 determines whether an AF frame moving operation (i.e., an instruction for moving the AF execution position) on the operation unit 70 has been accepted from the user. In a case where the system control unit 50 determines that the AF frame moving operation has been accepted, processing proceeds to step S703; otherwise, processing proceeds to step S704. Note that the AF frame moving operation may include a directional instruction operation on the MC 65, a directional instruction operation on the four-direction key 74, a touch operation on the touchscreen 70a, and a moving operation based on a moving instruction operation performed via eyeline input for the eyeline detection block 160.

In step S703, the system control unit 50 moves the focus adjustment position based on the operation performed in step S702. In step S704, the system control unit 50 determines whether an operation of ending the AF frame selection screen (e.g., depression of the magnification button 78 or depression of the SET button 75) has been performed on the operation unit 70. In a case where the system control unit 50 determines that the operation of ending the AF frame selection screen has been performed, the AF frame selection screen processing is ended; otherwise, processing returns to step S702.

In step S705, the system control unit 50 changes the LV image displayed on the display unit 28 so that the LV image is displayed without exposure Simulation. That is to say, display with exposure Simulation is temporarily cancelled (turned OFF). For example, if the magnification button 78 is depressed to make a transition to the AF frame selection screen in a state where exposure Simulation is ON and display is performed as shown in FIG. 6A and FIG. 6B, the system control unit 50 changes to the display of FIG. 6C that is not relevant to the setting values that have been set.

In step S706, the system control unit 50 determines whether an AF frame moving operation (i.e., an instruction for moving the AF execution position) on the operation unit 70 has been accepted from the user. In a case where the system control unit 50 determines that the AF frame moving operation has been accepted, processing proceeds to step S707; otherwise, processing proceeds to step S708.

In step S707, the system control unit 50 moves the position of the AF frame 600 (focus adjustment position) based on the operation accepted in step S706. In step S708, the system control unit 50 determines whether an operation of ending the AF frame selection screen (e.g., depression of the magnification button 78 or depression of the SET button 75) has been performed on the operation unit 70. In a case where the operation of ending the AF frame selection screen has been performed, processing proceeds to step S709; otherwise, processing proceeds to step S706.

In step S709, the system control unit 50 changes the LV image displayed on the display unit 28 so that the LV image is displayed with exposure Simulation (exposure Simulation, which was temporarily deactivated, is restored to the activated state). That is to say, the above-described display of FIG. 6C is changed (restored) to the display of FIG. 6A and FIG. 6B.

As described above, according to the present embodiment, in moving the focus adjustment position on the AF frame selection screen with respect to an LV image which reflects the values of the exposure settings during simulation display (in which subjects are difficult to visually recognize), subjects are temporarily displayed under appropriate exposure that is not relevant to the values of the exposure settings. This makes it easy for the user to accurately move the frame. Note that the sequence of operations may be interrupted in mid-course in a case where an abnormal operation, such as rotation of a mode dial and the like during the sequence of operations of the present processing, is performed.

<Sequence of Operations of MC (Multi-Controller) Operation Processing>

Next, a description is given of a sequence of operations of the MC operation processing in step S312 with reference to FIGS. 8A and 8B. Note that the present processing is realized by the system control unit 50 deploying the program stored in the nonvolatile memory 56 to a working area of the system memory 52 and executing the program, similarly to the processing shown in FIGS. 3A and 3B. FIGS. 8A and 8B show an example in which simulation display of an LV image displayed on the display unit 28 is changed when the AF frame has been moved using the MC in the present embodiment.

In step S801, the system control unit 50 determines whether the AF method is face+tracking priority AF. In a case where the system control unit 50 determines that the AF method setting is face+tracking priority AF based on, for example, the setting values of the digital camera 100, processing proceeds to step S810; otherwise, processing proceeds to step S802.

In step S802, the system control unit 50 determines whether exposure Simulation is set to be performed. In a case where exposure Simulation is set to be performed, processing proceeds to step S804; otherwise, processing proceeds to step S803. Note that in step S801 also, whether the exposure value set by the user is within a range of specific thresholds may be additionally used as a determination condition in addition to the determination of whether exposure Simulation is set to be performed, similarly to step S505. Alternatively, whether exposure Simulation display is currently performed may be additionally used as a determination condition.

In step S803, the system control unit 50 moves the position of the AF frame 600 (focus adjustment position) in the instructed direction based on the directional instruction operation performed on the MC 65. In step S804, the system control unit 50 changes the live-view image displayed on the display unit 28 so that the live-view image is displayed without exposure Simulation. Similarly to step S705, the live-view image displayed on the display unit 28 is changed so that the live-view image is displayed without exposure Simulation (display with exposure Simulation is temporarily cancelled). In a case where exposure Simulation is not performed, the LV image is displayed on the display unit 28 with brightness under approximate exposure based on the photometry result. As a result, the aforementioned display of FIG. 6A or FIG. 6B is changed to the display of FIG. 6C. Therefore, the details of subjects can be confirmed from dark areas to bright areas, and it becomes easy to confirm whether the AF frame 600 was able to be moved to the intended position among the subjects.

In step S805, the system control unit 50 moves the focus adjustment position, similarly to step S803. In step S806, the system control unit 50 determines whether a predetermined period has elapsed after the focus adjustment position was moved (a predetermined period has elapsed since the AF frame 600 was last moved in step S805). This makes it possible to maintain the display in which exposure Simulation is cancelled for the predetermined period after the completion of the movement of the AF frame 600 by the MC 65, thereby giving the user time to confirm the moved AF frame and subjects. The predetermined period may be approximately 1 second, or may be approximately 0.5 seconds. In a case where the predetermined period has elapsed, processing proceeds to step S807; otherwise, processing proceeds to step S808.

In step S807, the system control unit 50 changes the LV image displayed on the display unit 28 so that the LV image is displayed with exposure Simulation. In step S808, the system control unit 50 determines whether the stop-down button 83 has been depressed. In a case where the system control unit 50 determines that the stop-down button has been depressed, processing proceeds to step S809; otherwise, processing proceeds to step S806.

In step S809, the system control unit 50 determines whether exposure Simulation is set to be performed during stop-down. In this way, in a case where the user wishes to instantly reflect the depth of field and the exposure value in the LV display by performing the stop-down operation, the instant reflection can be realized even in a case where the predetermined period has not elapsed. In a case where exposure Simulation is set to be performed during stop-down, processing proceeds to step S807; otherwise, processing proceeds to step S806.

In step S810, the system control unit 50 determines whether a specific type of subject, which is a candidate for an AF target, has been detected. In the present embodiment, it is assumed that the specific type of subject is a human face. However, the specific type of subject is not limited to this, and may be another type of subject as long as it is a detectable subject type that is assumed to have high priority as the AF target, such as a human pupil, an animal face, a ride, and a flower. In a case where the specific type of subject (face) has been detected, the system control unit 50 proceeds to step S811; otherwise, the MC operation processing is ended.

In step S811, the system control unit 50 determines whether exposure Simulation is set to be performed. In a case where the system control unit 50 determines that exposure Simulation is set to be performed, processing proceeds to step S815; otherwise, processing proceeds to step S812.

In step S812, the system control unit 50 determines whether one face has been detected. In a case where one face has been detected, the system control unit 50 proceeds to step S813; otherwise, the system control unit 50 proceeds to step S814. In step S813, the system control unit 50 confirms the latest behavior of the detected subject. That is to say, tracking of one detected face is continued. A tracking target is not changed in response to the operation on the MC 65 because another face to replace the target has not been detected.

In step S814, the system control unit 50 changes a tracked subject. That is to say, a tracking target is changed from the face that was tracked before the operation was performed on the MC 65 to another face based on the direction of the operation performed on the MC 65 among the plurality of detected faces, and tracking is performed with respect to the changed tracking target.

In step S815, the system control unit 50 changes the LV image displayed on the display unit 28 so that the LV image is displayed without exposure Simulation (display with exposure Simulation is temporarily cancelled). As a result, the aforementioned display of FIG. 6A and FIG. 6B is changed to the display of FIG. 6C. Therefore, the user can confirm the details of subjects from dark areas to bright areas, and it becomes easy to confirm whether the AF frame 600 (in this case, the frame that indicates the focus adjustment position as well as the tracking target) was able to be moved to the position of an intended subject among the plurality of subjects of the specific type.

In step S816, the system control unit 50 determines whether there is one detected subject. In a case where there is one detected subject, processing proceeds to step S817; otherwise, processing proceeds to step S820. In step S817, the system control unit 50 confirms the latest behavior of the detected subject. In step S818, the system control unit 50 determines whether a predetermined period has elapsed after the MC operation was ended. In a case where the predetermined period has elapsed, processing proceeds to step S819; otherwise, processing proceeds to step S821. In step S819, the system control unit 50 changes the live-view image displayed on the display unit 28 so that the live-view image is displayed with exposure Simulation. In step S820, the system control unit 50 changes a tracked subject.

In step S821, the system control unit 50 determines whether the stop-down button has been depressed. In a case where the system control unit 50 determines that the stop-down button has been depressed, processing proceeds to step S822; otherwise, processing proceeds to step S818. In step S822, the system control unit 50 determines whether exposure Simulation is set to be performed during stop-down. In a case where exposure Simulation is set to be performed during stop-down, processing proceeds to step S819; otherwise, processing proceeds to step S818.

As described above, according to the present embodiment, in moving the AF frame using the MC with respect to an LV image which reflects the values of the exposure settings during simulation display (in which subjects are difficult to visually recognize), subjects are temporarily displayed under appropriate exposure that is not relevant to the values of the exposure settings. This enables the user to accurately move the frame.

Note, although the foregoing description has been provided using an operation on the MC 65 as an example, no limitation is intended by this. In one mode, it is sufficient to use an operation member on which a directional instruction operation can be performed. A frame moving instruction operation may be performed using the direction key 74, or a moving instruction may be issued using a moving instruction operation based on eyeline input for the eyeline detection block 160. Note that the flow may be interrupted in mid-course in a case where an abnormal operation, such as rotation of a mode dial and the like during the sequence of operations of the present processing, is performed.

Other Embodiments

Note, although the above embodiment has been described using an example of an operation of moving the AF frame as an example of movement of the execution position of a specific function related to shooting, an operation of moving the execution position of a specific function related to shooting is not limited to this. The present invention is also applicable to an operation performed with respect to an AE frame, a diorama frame, an import frame for manual white balance (WB), and the like as long as it has a function that enables the user to designate the execution position inside a subject image. Note that the AF frame, the AE frame, the diorama frame, and the import frame for manual WB are indicators that respectively indicate the execution position of autofocus (focus adjustment position), the execution position of automatic exposure, the setting position related to the diorama effects, and the import position of manual WB. The diorama frame is the indicator that indicates the position to which the diorama effects (miniature effects) are added. The diorama effects refer to the effects whereby, by applying blurring processing to the outside of the diorama frame through image processing, an image that pretends to give the impression of being a closeup photograph with a small depth of field (a diorama photograph) is generated.

Also, various types of control that have been described above as being performed by the system control unit 50 may be performed by one item of hardware, or the entire apparatus may be controlled by a plurality of items of hardware (e.g., a plurality of processors and circuits) sharing processing.

Furthermore, although the above embodiment has been described using an exemplary case where the present invention is applied to the digital camera, no limitation is intended by this example, and the present invention is applicable to an electronic apparatus capable of performing simulation display using the exposure value. That is to say, the present invention is also applicable to a personal computer, a tablet terminal, a mobile telephone terminal (e.g., smartphone), a mobile image viewer, a watch-shaped or eyeglass-shaped information terminal, a medical device, a music player, a game device, an electronic book reader, and so forth.

Furthermore, the present invention is applicable not only to a main body of an image capturing device, such as a digital camera, but also to a control apparatus that communicates with an image capturing device via wired or wireless communication and remotely controls the image capturing device. Examples of an apparatus that remotely controls an image capturing device include such devices as a smartphone, a tablet PC, and a desktop PC. An image capturing device can be remotely controlled by a control apparatus notifying the image capturing device of a command for causing various types of operations and settings to be performed and configured based on an operation performed on the control apparatus or processing performed on the control apparatus. In addition, an LV image (live-view image) shot by an image capturing device may be receivable via wired or wireless communication and displayable on a control apparatus.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-038127, filed, Mar. 5, 2020 which is hereby incorporated by reference herein in its entirety.

What is claimed is:

1. An electronic apparatus comprising:
an image capturing unit;
one or more processors; and
a memory storing programs which, when the programs are executed by the one or more processors, cause the electronic apparatus to function as:
a setting unit configured to set a specific parameter related to exposure;
a detecting unit configured to detect a touch operation on a display; and
a control unit configured to perform control so that an execution position on a live-view image of a specific function related to shooting is changed based on a touch position of the touch operation detected by the detecting unit and display is performed to display a live-view image captured by the image capturing unit with brightness that is relevant to the specific parameter set by the setting unit on a basis of the changed execution position,
wherein the control unit performs control:
while detecting a touch operation by the detecting unit, based on a movement of a touch position of the touch operation, to change the execution position to a position that follows the changed touch position and not to change brightness of a live-view image based on the changed execution position; and,
in response to detecting that the touch operation is ended, display a live-view image with brightness that is relevant to the specific parameter set by the setting unit changed based on the execution position changed by the touch operation.

2. The electronic apparatus according to claim 1, wherein the specific parameter is related to at least one of exposure compensation, a diaphragm, a shutter speed, and an ISO film speed.

3. The electronic apparatus according to claim 1, wherein the execution position of the specific function related to shooting is at least one of a focus adjustment position, an execution position of automatic exposure, a setting position related to diorama effects, and an import position of manual white balance.

4. The electronic apparatus according to claim 1, wherein while detecting a touch operation by the detecting unit, the control unit performs control to display the live-view image with brightness corresponding to a photometry result.

5. The electronic apparatus according to claim 4, wherein the brightness corresponding to the photometry result is brightness based on a result of photometry performed using a set photometry method and not relevant to the specific parameter set by the setting unit.

6. The electronic apparatus according to claim 1, wherein in a case where exposure compensation is set to underexposure based on the specific parameter set by the setting unit, the control unit performs control, while detecting a touch operation by the detecting unit, to display a live-view image brighter than a live-view image displayed after detecting that the touch operation is ended.

7. The electronic apparatus according to claim 1, wherein in a case where exposure compensation is set to overexposure based on the specific parameter set by the setting unit, the control unit performs control, while detecting a touch operation by the detecting unit, to display a live-view image that is darker than a live-view image displayed after detecting that the touch operation is ended.

8. The electronic apparatus according to claim 1, wherein the control unit performs control to display the specific parameter together with the live-view image in a first manner while the live-view image is displayed and detecting a touch operation by the detecting unit, and performs control to display the specific parameter in a display format different from display in the first manner while the live-view image is displayed after detecting that the touch operation is ended.

9. The electronic apparatus according to claim 8, wherein the display format different from the first manner includes one of a format in which the specific parameter is displayed using a color different from display in the first manner, a format in which the specific parameter displayed in the first manner is grayed out, and a format in which the specific parameter is not displayed.

10. A control method of an electronic apparatus, the control method comprising:
setting a specific parameter related to exposure;
detecting a touch operation on a display; and
performing control so that an execution position on a live-view image of a specific function related to shooting is changed based on a touch position of the touch operation detected by the detecting unit and display is performed to display a live-view image captured by the electronic apparatus with brightness that is relevant to the specific parameter set in the setting on a basis of the changed execution position,
wherein the performing control includes:
while detecting a touch operation in the detecting, based on a movement of a touch position of the touch operation, changing the execution position to a position that follows the changed touch position and not changing brightness of a live-view image based on the changed execution position; and,
in response to detecting that the touch operation is ended, displaying a live-view image with brightness that is relevant to the specific parameter set by the setting unit changed based on the execution position changed by the touch operation.

11. A non-transitory computer-readable storage medium comprising instructions for performing a control method of an electronic apparatus, the control method comprising:
setting a specific parameter related to exposure;
detecting a touch operation on a display; and
performing control so that an execution position on a live-view image of a specific function related to shooting is changed based on a touch position of the touch operation detected by the detecting unit and display is performed to display a live-view image captured by the electronic apparatus with brightness that is relevant to the specific parameter set in the setting on a basis of the changed execution position,
wherein the performing control includes:
while detecting a touch operation in the detecting, based on a movement of a touch position of the touch operation, changing the execution position to a position that follows the changed touch position and not changing brightness of a live-view image based on the changed execution position; and, in response to detecting that the touch operation is ended, displaying a live-view image with brightness that is relevant to the specific parameter set by the setting unit changed based on the execution position changed by the touch operation.

\* \* \* \* \*